(12) United States Patent
Mozaffari et al.

(10) Patent No.: US 12,174,689 B1
(45) Date of Patent: Dec. 24, 2024

(54) SYSTEM AND METHOD FOR ONLINE MULTIVARIATE ANOMALY DETECTION AND LOCALIZATION

(71) Applicant: University of South Florida, Tampa, FL (US)

(72) Inventors: Mahsa Mozaffari, Rochester, NY (US); Keval Doshi, Tampa, FL (US); Yasin Yilmaz, Tampa, FL (US)

(73) Assignee: University of South Florida, Tampa, FL (US)

( * ) Notice: Subject to any disclaimer, the term of this patent is extended or adjusted under 35 U.S.C. 154(b) by 888 days.

(21) Appl. No.: 17/320,911

(22) Filed: May 14, 2021

Related U.S. Application Data

(60) Provisional application No. 63/026,196, filed on May 18, 2020.

(51) Int. Cl.
*G06F 11/00* (2006.01)
*G06N 20/00* (2019.01)

(52) U.S. Cl.
CPC ......... *G06F 11/006* (2013.01); *G06N 20/00* (2019.01); *G06F 2201/86* (2013.01)

(58) Field of Classification Search
None
See application file for complete search history.

(56) References Cited

U.S. PATENT DOCUMENTS

| | | | |
|---|---|---|---|
| 7,792,770 B1* | 9/2010 | Phoha | G06N 20/00 706/45 |
| 9,306,966 B2* | 4/2016 | Eskin | H04L 63/1425 |
| 10,387,445 B2* | 8/2019 | Limonad | G06F 16/26 |
| 2015/0058982 A1* | 2/2015 | Eskin | G06F 16/84 726/23 |
| 2017/0193078 A1* | 7/2017 | Limonad | G06F 21/552 |
| 2019/0188212 A1* | 6/2019 | Miller | H04L 63/145 |
| 2020/0334228 A1* | 10/2020 | Matyska | G06Q 30/0185 |

OTHER PUBLICATIONS

Li, J. et al., Clustering-based anomaly detection in multivariate time series data, Applied Soft Computing Journal, 100 (2021) 106919.
Zhao, H. et al., Multivariate Time-series Anomaly Detection via Graph Attention Network, 2020 IEEE International Conference on Data Mining (ICDM), Nov. 17-20, 2020.
Choi, Y. et al., GAN-based Anomaly Detection and Localization of Multivariate Time Series Data for Power Plant, 2020 IEEE International Conference on Big Data and Smart Computing (BigComp), (2020) pp. 71-74.

(Continued)

*Primary Examiner* — Haimei Jiang
(74) *Attorney, Agent, or Firm* — Molly L. Sauter; Smith & Hopen, P.A.

(57) ABSTRACT

A system and method for real-time detection of anomalies in high-dimensional systems. Various embodiments detect anomalies quickly and accurately to allow adequate time for appropriate countermeasures to be implemented. The sequential and multivariate anomaly detection method scales well to high-dimensional datasets using a nonparametric and semi-supervised approach that trains only on nominal data.

20 Claims, 12 Drawing Sheets

(56) References Cited

OTHER PUBLICATIONS

Avanesov, V. et al., Change-point detection in high-dimensional covariance structure, Electronic Journal of Statistics, vol. 12 (2018) 3254-3294.
Baker, M. Statisticians issue warning on P values, Nature, In Focus News, vol. 531 (Mar. 2016) 151.
Banerjee, T. et al., Quickest Hub Discovery in Correlation Graphs, Asilomar (2016) 1248-1255.
Banerjee, T. et al., Quickest Detection for Changes in Maximal kNN Coherence of Random Matrices, Fellow, IEEE (2015).
Chandola, V. et al., Anomaly Detection: A Survey, ACM Comput. Surv. 41, 3, Article 15 (Jul. 2009), 58 pages.
Chen, H., Sequential Change-Point Detection Based on Nearest Neighbors, The Annals of Statistics, vol. 47, No. 3 (2019) 1381-1407.
Douligeris, C. et al., DDoS attacks and defense mechanisms: classification and state-of-the-art, Computer Networks 44 (2004) 643-666.
Fukunaga, K. et al., A Nonparametric Two-Dimensional Display for Classification, IEEE Transactions on Pattern Analysis and Machine Intelligence, vol. PAMI-4, No. 4 (Jul. 1982) 427-436.
Gelman, A. The Problems With P-Values are not Just With P-Values, The American Statistician, Online Discussion (2016).
Habeeb, R. A. A. et al., Real-time big data processing for anomaly detection: A Survey, International Journal of Information Management 45 (2019) 289-307.
Haydari, A. et al., Real-Time Detection and Mitigation of DDoS Attacks in Intelligent Transportation Systems, in 2018 21st International Conference on Intelligent Transportation Systems (ITSC). IEEE, 2018, pp. 157-163.
Hundman, K. et al., Detecting Spacecraft Anomalies Using LSTMs and Nonparametric Dynamic Thresholding, In KDD '18: The 24th ACM SIGKDD International Conference on Knowledge Discovery & Data Mining, Aug. 19-23, 2018, London, United Kingdom. ACM, New York, NY, USA, 9 pages.
Kolias, C. et al., DDoS in the IoT: Mirai and Other Botnets, Cybertrust, Computer, IEEE Computer Society (2017) 40-44.
Lee, W. et al., Information-Theoretic Measures for Anomaly Detection, in Security and Privacy, 2001 Proceedings 2001 IEEE Symposium on IEEE (2001) pp. 130-143.
Lorden, G. Procedures for Reacting to a Change in Distribution, The Annals of Mathematical Statistics, vol. 42, No. 6 (1971) 1897-1908.
Martos, G. et al., Entropy Measures for Stochastic Processes with Applications in Functional Anomaly Detection, Entropy, 20, 33 (2018).
Mei, Y. Efficient scalable schemes for monitoring a large number of data streams, Biometrika, vol. 97, No. 2 (Jun. 2010), pp. 419-433.
Meidan, Y. et al., N-BaIoT—Network-Based Detection of IoT Botnet Attacks Using Deep Autoencoders, IEEE Pervasive Computing, Jul.-Sep. 2018.
Mirsky, Y. et al., Kitsune: An Ensemble of Autoencoders for Online Network Intrusion Detection (2018).
Moser, B. A. et al., On Stability of Distance Measures for Event Sequences Induced by Level-Crossing Sampling, IEEE Transactions on Signal Processing, vol. 62, No. 8 (Apr. 2014) 1987-1999.
Moustakides, G. V. Optimal Stopping Times for Detecting Changes in Distributions, The Annals of Statistics, vol. 14, No. 4 (1986) 1379-1387.
Muja, M. et al., Scalable Nearest Neighbor Algorithms for High Dimensional Data, IEEE Transactions on Pattern Analysis and Machine Intelligence, vol. 36, No. 11 (Nov. 2014) 2227-2240.
Page, E. S., Continuous Inspection Schemes, Biometrika, Jun. 1954, vol. 41, No. 1/2 (Jun. 1954), pp. 100-115.
Remus, J. J. et al., Comparison of a distance-based likelihood ratio test and k-nearest neighbor classification methods, Machine Learning for Signal Processing, 2008 IEEE Workshop (2008) pp. 362-367.
Scott, C. D. et al., Learning Minimum Volume Sets, Journal of Machine Learning Research, 7 (2006) 665-704.
Soltan, S. et al., BlackIoT: IoT Botnet of High Wattage Devices Can Disrupt the Power Grid, Included in the Proceedings of the 27th USENIX Security Symposium. Aug. 15-17, 2018, Baltimore, MD, USA.
Sricharan, K. et al., Efficient anomaly detection using bipartite k-NN graphs, Advances in Neural Information Processing Systems (2011) pp. 478-486.
Steinwart, I. et al., A Classification Framework for Anomaly Detection, Journal of Machine Learning Research, 6 (2005) 211-232.
Xiang, Y. et al., Low-Rate DDoS Attacks Detection and Traceback by Using New Information Metrics, IEEE Transactions on Information Forensics and Security, vol. 6, No. 2 (Jun. 2011) 426-437.
Yilmaz, Y. Online Nonparametric Anomaly Detection based on Geometric Entropy Minimization, 2017 IEEE International Symposium on Information Theory (ISIT), (2017) pp. 3010-3014.
Yilmaz, Y. et al., Mitigating IoT-based Cyberattacks on the Smart Grid, Machine Learning and Applications (ICMLA), 2017 16th IEEE International Conference on. IEEE, 2017, pp. 517-522.
Zambon, D. et al., Concept Drift and Anomaly Detection in Graph Streams, IEEE transactions on neural networks and learning systems, No. 99 (2018) pp. 1-14.
Zhang, Z. et al., Optimal Scoring for Unsupervised Learning, Advances in Neural Information Processing Systems, Citeseer, NIPS 2009.
Zhang, H. et al., Threshold Tuning-Based Wearable Sensor Fault Detection for Reliable Medical Monitoring Using Bayesian Network Model, IEEE Systems Journal, vol. 12, No. 2 (Jun. 2018) 1886-1896.
Ahmed, T. et al., Multivariate Online Anomaly Detection Using Kernel Recursive Least Squares, IEEE Infocom 2007 proceedings (2007) 625-633.
Singh, R. et al., An intrusion detection system using network traffic profiling and online sequential extreme learning machine, Expert Systems With Applications 42 (2015) 8609-8624.
Ahmed, T. et al. Online Anomaly Detection using KDE, Global Telecommunications Conference, 2009. GLOBECOM 2009.

\* cited by examiner (a) Standard Gaussian distribution (b) Poisson distribution, $\lambda = 2$ (c) Multinomial distribution (d) A complex 2d distribution

SYSTEM AND METHOD FOR ONLINE MULTIVARIATE ANOMALY DETECTION AND LOCALIZATION

CROSS-REFERENCE TO RELATED APPLICATIONS

This application claims priority to U.S. Provisional Patent Application No. 63/026,196, entitled "System and Method for Online Multivariate Anomaly Detection and Localization", filed on May 18, 2020 by the same inventors, the entirety of which is incorporated herein by reference.

BACKGROUND OF THE INVENTION

Anomaly detection is an important problem dealing with the detection of abnormal data patterns. It has applications in a variety of different domains, such as cybersecurity, medical health care, quality control, etc. The importance of anomaly detection lies in the fact that an anomaly in the observation data may be a sign of an unwanted event such as failure, malicious activity, etc. in the underlying system. Therefore, accurate detection of such data patterns will allow proper countermeasures to be taken by the domain specialist to counteract any possible harm. To name a few examples, an anomaly in the MRI image could be due to the presence of a malignant tumor in the brain; and anomalous observations in the network traffic data could mean that the network is under a cyber-attack.

The advances in various technologies such as Internet-of-Things (IoT) devices and sensors, and wireless communications, have enabled the real-time monitoring of systems for detecting events of interest. In many modern and complex systems, such as IoT networks, network-wide traffic monitoring systems and environmental monitoring systems, massive amounts of heterogeneous data are generated, which require real-time processing for timely detection of anomalous events. As an example, automated vehicles and advanced driver-assistance systems today are equipped with modules comprising many sensors and actuators for control and safety purposes. Due to the catastrophic consequences of any fault in perceiving the environment or failure in a component of the system, as well as being compromised by hackers, it is crucial to preserve the robustness of the vehicle. To this end, the high-dimensional measurements from sensors need to be monitored and analyzed in real-time to detect anomalies such as sudden increase of speed, abnormal petrol consumption, anomalies in radar sensors and camera sensing. Accurate and light-weight anomaly detection methods that can scale well to large systems are needed to be able to address such big data challenges in real-time.

Anomaly detection methods on univariate data streams have been studied thoroughly in the literature. However, little work has been done on multivariate anomaly detection, which has the potential to achieve quicker and more accurate detection than univariate anomaly detection by capturing more anomaly evidence in the interactions between system dimensions. Statistical approaches to anomaly detection assume anomaly to be a change in the probability distribution of the observations, such as a change in the mean, variance, or correlation structure between the data-streams. One important application for detecting changes in the correlation structures is finance, where the correlation structures between high dimensional processes modeling the exchange rates and market indexes are important for the right choice of asset allocation in a portfolio. Furthermore, in social networks, it is important to detect abrupt changes in interactions between the nodes, and in communication networks, it is of interest to detect highly correlated traffic in a network. Distributed Denial of Service (DDOS) attacks to the power grid through synchronous switching ON/OFF of high-wattage IoT devices is another example where anomaly is manifested in correlations. Detection of change in correlation structure requires the joint monitoring and multivariate analysis of the data-streams, which in turn, leads to the high-dimensionality challenge. To overcome this challenge, a desired anomaly detection technique needs to be scalable to high-dimensional data in real time.

Anomaly detection in many systems such as fraud detection could be the ultimate goal, however, in many scenarios, such as diagnosis systems (e.g., spacecraft monitoring system) and cybersecurity, it is highly important to provide a degree of interpretation about the detected issue in the system and how to mitigate it. Considering the potential damages caused by failure in mitigation of unexpected behaviors, such as cyberattacks, detecting anomalies without providing any further information explaining where the anomaly has happened is of limited value to the engineers.

Motivated by the aforementioned challenges, what is needed in the art is an online multivariate anomaly detection and localization technique that is simple enough to handle high-dimensional and heterogeneous data in real-time.

SUMMARY OF THE INVENTION

In various embodiments, the present invention provides a system and method for the real-time detection of anomalies in high-dimensional systems. The methods of the present invention are effective in detecting anomalies quickly and accurately so that the appropriate countermeasures can be taken in time, before the system is potentially harmed. A sequential and multivariate anomaly detection method is provided which scales well to high-dimensional datasets. The proposed method follows a nonparametric, i.e., data-driven, and semi-supervised approach, i.e., trains only on nominal data. Thus, it is applicable to a wide range of applications and data types. Thanks to its multivariate nature, it can quickly and accurately detect challenging anomalies, such as changes in the correlation structure and stealth low-rate cyberattacks. Its asymptotic optimality and computational complexity are comprehensively analyzed. In conjunction with the detection method, an effective technique for localizing the anomalous data dimensions is also proposed. The proposed detection and localization methods are further expanded to a supervised setup where an additional anomaly dataset is available, and the proposed semi-supervised and supervised algorithms are combined to obtain an online learning algorithm under the semi-supervised framework. The practical use of the proposed algorithms is demonstrated in DDOS attack mitigation, and their performances are evaluated using a real IoT-botnet dataset and simulations.

In one embodiment, the present invention provides a computer implemented method for data anomaly detection. In one embodiment, the method utilizes a nominal training set for detecting and localizing data anomalies transmitted over a network. In a training phase utilizing a nominal training set, the method includes receiving a nominal training set comprising nominal data points by one or more computer processors and partitioning, by the one or more computer processors, the nominal training set into a first subset of nominal data points and a second subset of nominal data points. The method further includes identifying, by the one or more computer processors, for each nominal data point in the first subset of nominal data points a kth-nearest-neighbor (k-NN) distance with respect to each nominal data point in the second subset of nominal data points and selecting, by the one or more computer processors, the nominal data points with the smallest total edge length based upon the k-NN distances to estimate a most compact set of the nominal data points of the nominal training set having a smallest total edge length. In a testing phase, the method includes, receiving, by the one or more computer processors, a test set of data points and calculating, by the one or more computer processors, a total edge length to k-NN with respect to each nominal data point in the second subset of nominal data points. The method further includes, calculating, by the one or more computer processors, first anomaly evidence for each of the data points of the test set based upon the total edge length and the smallest total edge length, accumulating, by the one or more computer processors, the first anomaly evidence over time and declaring, by the one or more computer processors, that a first anomalous event has occurred when the first anomaly evidence exceeds a first predetermined threshold.

In an additional embodiment, a method is provided which also tests the data points utilizing an anomalous data set, wherein the method includes receiving an anomalous training set comprising anomalous data points by the one or more computer processors and pre-processing, by the one or more computer processors, the anomalous training set to identify to remove anomalous data points that lie within the most compact set of the nominal data points to provide a pre-processed anomalous training set. The method further includes calculating, by the one or more computer processors, second anomaly evidence for each of the data points of the test set based upon the smallest total edge length and the pre-processed anomalous training set, accumulating, by the one or more computer processors, the second anomaly evidence over time and declaring, by the one or more computer processors, that a second anomalous event has occurred when the second anomaly evidence exceeds a second predetermined threshold.

The methods utilizing a nominal training set and an anomalous data set can be performed in parallel and a combined method may include updating the anomalous training set based upon anomalous events declared with the nominal training set. In particular, the nominal training set and the anomalous training set may be received in parallel and the step of declaring, by the one or more computer processors, that a first anomalous event has occurred and the step of declaring, by the one or more computer processors, that a second anomalous event has occurred are performed in parallel.

In additional to detection data anomalies, the method of the present invention is further configured to identify a data dimension in which the first anomalous event or the second anomalous event occurred to localization the first anomalous event or the second anomalous event, respectively. Following the detection of a first anomalous event or a second anomalous event, the method may additionally include identifying, by the one or more computer processors, a most recent time when the first anomaly evidence was equal to zero to estimate an onset time of the first anomalous event and localizing, by the one or more computer processors, the first anomalous event, by determining which dimension of the test set was anomalous at the onset time of the first anomalous event.

In an additional embodiment, the present invention provides a computer program product for data anomaly detection, wherein the computer program product comprises one or more computer readable storage devices and program instructions stored on the one or more computer readable storage devices. In a first embodiment of the computer program product for data anomaly detection utilizing a nominal training set, the program instructions include programmed instructions receiving a nominal training set comprising nominal data points by one or more computer processors and programmed instructions partitioning, by the one or more computer processors, the nominal training set into a first subset of nominal data points and a second subset of nominal data points. The program instructions further include programmed instructions identifying, by the one or more computer processors, for each nominal data point in the first subset of nominal data points a kth-nearest-neighbor (k-NN) distance with respect to each nominal data point in the second subset of nominal data points, programmed instructions selecting, by the one or more computer processors, the nominal data points with the smallest total edge length based upon the k-NN distances to estimate a most compact set of the nominal data points of the nominal training set having a smallest total edge length, programmed instructions receiving, by the one or more computer processors, a test set of data points, programmed instructions calculating, by the one or more computer processors, a total edge length to k-NN with respect to each nominal data point in the second subset of nominal data points, programmed instructions calculating, by the one or more computer processors, first anomaly evidence for each of the data points of the test set based upon the total edge length and the smallest total edge length, programmed instructions accumulating, by the one or more computer processors, the first anomaly evidence over time and programmed instructions declaring, by the one or more computer processors, that a first anomalous event has occurred when the first anomaly evidence exceeds a first predetermined threshold.

In a second a second embodiment of the computer program product for data anomaly detection utilizing a anomalous training set, the program instructions include programmed instructions receiving an anomalous training set comprising anomalous data points by the one or more computer processors, programmed instructions pre-processing, by the one or more computer processors, the anomalous training set to identify to remove anomalous data points that lie within the most compact set of the nominal data points to provide a pre-processed anomalous training set, programmed instructions calculating, by the one or more computer processors, second anomaly evidence for each of the data points of the test set based upon the smallest total edge length and the pre-processed anomalous training set, programmed instructions accumulating, by the one or more computer processors, the second anomaly evidence over time and programmed instructions declaring, by the one or more computer processors, that a second anomalous event has occurred when the second anomaly evidence exceeds a second predetermined threshold.

In another embodiment, the present invention provides a computer system for data anomaly detection, which includes one or more computer processors, one or more computer readable storage devices and program instructions stored on the one or more computer readable storage devices for execution by the one or more computer processors. In an embodiment utilizing nominal training data, the program instructions include, programmed instructions receiving a nominal training set comprising nominal data points by one or more computer processors, programmed instructions partitioning, by the one or more computer processors, the nominal training set into a first subset of nominal data points and a second subset of nominal data points, programmed instructions identifying, by the one or more computer processors, for each nominal data point in the first subset of nominal data points a kth-nearest-neighbor (k-NN) distance with respect to each nominal data point in the second subset of nominal data points, programmed instructions selecting, by the one or more computer processors, the nominal data points with the smallest total edge length based upon the k-NN distances to estimate a most compact set of the nominal data points of the nominal training set having a smallest total edge length, programmed instructions receiving, by the one or more computer processors, a test set of data points, programmed instructions calculating, by the one or more computer processors, a total edge length to k-NN with respect to each nominal data point in the second subset of nominal data points, programmed instructions calculating, by the one or more computer processors, first anomaly evidence for each of the data points of the test set based upon the total edge length and the smallest total edge length, programmed instructions accumulating, by the one or more computer processors, the first anomaly evidence over time and programmed instructions declaring, by the one or more computer processors, that a first anomalous event has occurred when the first anomaly evidence exceeds a first predetermined threshold. In an additional embodiment incorporate anomalous training date, the program instructions further include, programmed instructions receiving an anomalous training set comprising anomalous data points by the one or more computer processors, programmed instructions pre-processing, by the one or more computer processors, the anomalous training set to identify to remove anomalous data points that lie within the most compact set of the nominal data points to provide a pre-processed anomalous training set, programmed instructions calculating, by the one or more computer processors, second anomaly evidence for each of the data points of the test set based upon the smallest total edge length and the pre-processed anomalous training set, programmed instructions accumulating, by the one or more computer processors, the second anomaly evidence over time and programmed instructions declaring, by the one or more computer processors, that a second anomalous event has occurred when the second anomaly evidence exceeds a second predetermined threshold.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

Figure 1:
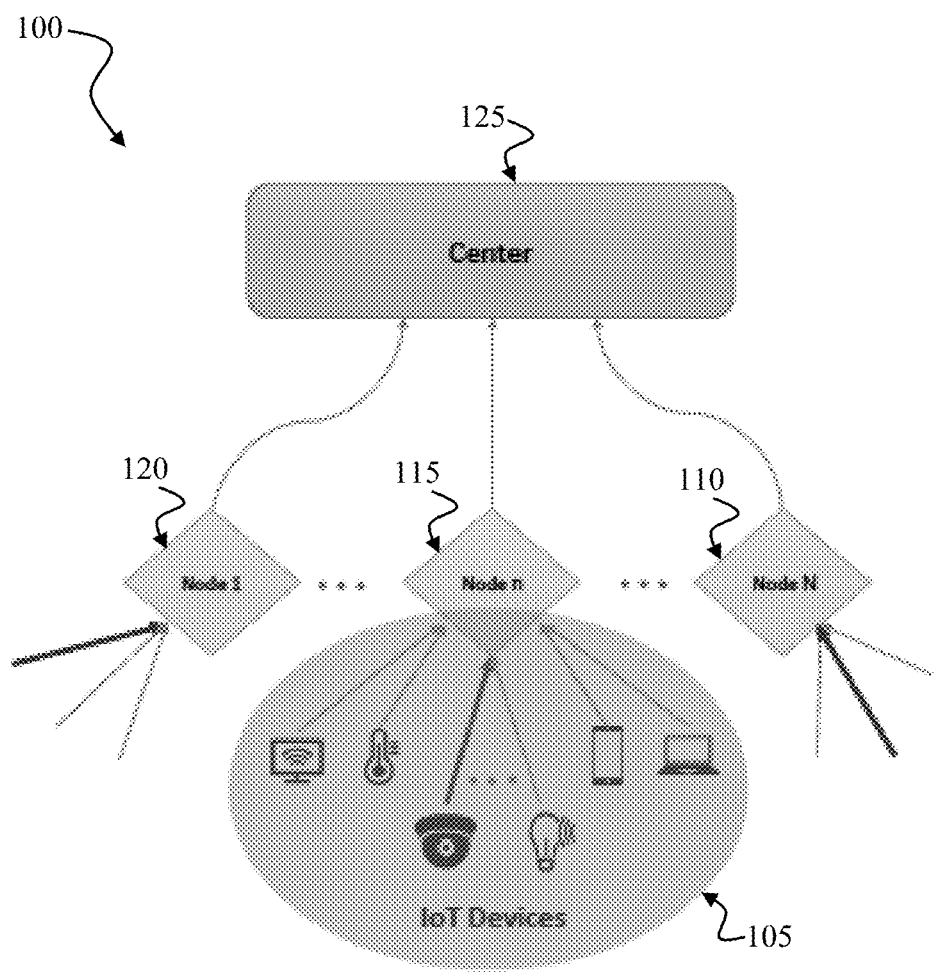
FIG. 1 illustrates a system model comprising IoT devices and a center comprising processing capabilities and storage means for detecting and localizing anomalous events, in accordance with an embodiment of the present invention.

The problem of anomaly detection has been an important subject of study in several research communities such as statistics, signal processing, machine learning, information theory and data mining, either specifically for an application domain or as a generic method. To name a few, a Support Vector Machine (SVM) classification approach for anomaly detection has been previously proposed, several information theoretic measures have been proposed for the intrusion detection problem and two new information metrics for Distributed Denial-of-Service (DDOS) attack detection have been introduced. Due to the challenging nature of the problem and considering the challenges posed by today's technological advances such as big data problems, there is still a need for reconsidering the anomaly detection problem.

Sequential anomaly detection techniques, compared to the outlier detection techniques, take the history of observations into account rather than only the new observations. Sequential techniques are more suitable for real-time systems where timely and accurate detection of anomalies is important. The Cumulative Sum (CUSUM) detector is a well-known sequential change detection technique that assumes probabilistic models for nominal and anomalous data points and computes the cumulative log-likelihood-ratio (LLR) over time, declaring an anomaly if the statistic exceeds a predefined threshold. The accuracy of assumed models, as well as the estimated parameters, are the key factors in the performance of CUSUM and more generally parametric methods. CUSUM is minimax optimum under the condition that the probability distributions before and after the change are completely known. However, in many real-world applications having a priori knowledge about the underlying distributions is not possible. Estimating the probability distributions quickly becomes intractable for high-dimensional data, which includes many unknowns such as the anomaly onset time, the subset of anomalous dimensions, in addition to the parameters of the nominal and anomalous models. To tackle with this complexity, others have proposed a relaxed version of CUSUM in which each data stream is assumed to be independent of others. However, this univariate method is not suitable for detecting changes in the correlation between data streams. A sequential test for detecting changes in the correlation between variables, as well as localizing the highly correlated variables, in high dimensional data streams has been proposed. This is a parametric method based on the assumption that the observed vectors are multivariate Gaussian distributed. It is proposed solely for the detection of correlation change between data streams and does not generalize to other changes in the distribution.

k-nearest-neighbor (kNN) distance-based methods are geometric methods that assume that anomalous data instances occur far from the nominal instances. For instance, nonparametric outlier detection techniques based on the minimum volume set (MVS) of the nominal data have been proposed. MVS corresponds to the region of greatest probability density with minimum data volume and is known to be useful for anomaly detection based on the assumption that anomalies occur in the less concentrated regions of the nominal dataset. These nonparametric outlier detection methods estimate the MVS of nominal training samples using kNN graphs and declare a data point as anomalous if it lies outside the MVS. Despite being scalable to high-dimensional and heterogeneous data, they do not consider the temporal anomaly information, and thus are prone to higher false alarm rates compared to sequential anomaly detection methods. Similarly, a kNN graph-based method has been proposed that computes an anomaly score for each observation and declares an anomaly by thresholding the score value. In the kNN graph-based method, as opposed to the outlier detection methods which treat a single outlier as an anomaly, one considers an anomaly to consist of persistent outliers and investigates sequential and nonparametric detection of such anomalies using the temporal information in the data streams. Recently, a nonparametric kNN-based sequential anomaly detection method has been proposed for multivariate observations. This method computes the test statistic based on the number of kNN edges at different splitting points within a window and stops the test whenever the test statistics exceed a threshold. Due to its window-based nature, this method has inherent limitations in achieving small detection delays. It also recomputes the kNN graphs at every time instance and for every splitting point, therefore its computational complexity is not suitable for real-time applications. Another recent work proposed a distance-based and CUSUM-like change detection method for attributed graphs. Attributed graphs are first mapped into numeric vectors, and then the distance between the mean response of an observation window and the mean response of the training data are computed via a CUSUM-like sequential algorithm. In addition to the limitations arising from the window-based nature of the method, the local relations between samples are disregarded due to considering only the mean response of the training set. As a result, in cases where training data has a multimodal distribution, this method will not be effective. As compared to prior attempts, the present invention takes into account the local relations between the data instances.

In various embodiments, the present invention provides for the timely and accurate detection of anomalies in high-dimensional systems employing two variations of a kNN-based sequential anomaly detection method, as well as a unified framework that combines the advantages of both methods.

In the system and methods of the present invention, the interest is in detecting general changes in unknown distributions, including the changes in correlation structure. As shown in FIG. 1, in an exemplary architecture 100 of the present invention, each IoT device 105 sends its data to the node 110, 115, 120 connected to it, respectively. The nodes 110, 115, 120 direct the data traffic from the IoT devices 105 to a center 125, such as a web server, data center or utility center. The architecture 100 is scalable in such a way that a node may represent a smart home consisting of tens of devices or a smart building/neighborhood access point consisting of thousands of devices.

Each IoT device 105 typically possess different data communication characteristics. In particular, the data content is typically different. For example, a thermostat would have a considerably smaller packet size as compared to video packets from a CCTV camera. Additionally, the communication protocol used may also be different, such as TCP, UDP or HTTP. In addition, for the same device, the data rates may differ significantly based upon the location or type of connection, e.g., a laptop connected via a fiber optical cable might send 1000 packets per second, whereas the same device may be sending 10 packets per second on a slower connection. The active communication frequency may also vary considerably, e.g., devices like printers update their status one a minute, whereas CCTV cameras send data every second. In the present work, the only assumption is that the node 110, 115, 120 perform a packet-based communication with the center 125.

A framework for multivariate, data-driven and sequential detection of anomalies in high-dimensional systems is proposed for both semi-supervised and supervised settings depending on the availability of labeled data. Combining the advantages of supervised and semi-supervised settings, an online learning scheme is further introduced which can effectively detect both known and unknown anomaly types by incorporating the newly detected anomalies into the training set. Asymptotic optimality of the proposed detection methods in the minimax sense is shown, and comprehensive analysis for computational complexity is provided. An anomaly localization technique to identify the problematic data dimensions is also proposed based on the proposed detection methods. The practicality of the proposed anomaly detection and localization methods is demonstrated on mitigating DDOS attacks through a real dataset.

In the problem formulation, suppose that a system is observed through d-dimensional observations $X_t=\{x_1, x_2, \ldots, x_t\}$ in time. The objective is to detect an anomaly occurring at an unknown time t as soon as possible while satisfying a false alarm constraint. This problem can be formulated as a change detection problem as follows:

$$f=f_0, \; t<\tau, \; f=f_1(\neq f_0), \; t\geq\tau, \quad (1)$$

where f is the true probability distribution of observations, $f_0$ and $f_1$ the nominal and anomaly probability distributions, respectively. The objective of the problem is to find the anomaly time T that minimizes the average detection delay while satisfying a false alarm constraint, i.e., $$\inf_T E_\tau[(T-\tau)^+] \text{ subject to } E_\infty[T] \geq \beta \quad (2)$$

where $E_\tau$ represents the expectation given that change occurs at $\tau$, $(.)^+=\max(.,0)$, and $E_\infty$ denotes the expectation given that no change occurs, i.e., the expectation of false alarm period.

Lorden's minimax problem is a commonly used version of the above problem, in which the goal is to minimize the worst-case average detection delay subject to a false alarm constraint:

$$\inf_T \sup_\tau \operatorname{ess\,sup}_\tau E_\tau[(T-\tau)^+|X_\tau] \text{ s.t. } E_\infty[T] \geq \beta, \quad (3)$$

where "ess sup" denotes essential supremum, which is equivalent to supremum in practice. In simple words, the minimax criterion minimizes the average detection delay for the least favorable change-point and the least favorable history of measurements up to the change-point while the average false alarm period is lower bounded by $\beta$.

The CUSUM test provides the optimum solution to the minimax problem, given by (3):

$$S_t=\max\{0, S_{t-1}+l_t\}, \quad (4)$$

$$T_c=\inf\{t: S_t \geq h_c\}$$

where, $T_c$ is the stopping time, $$l_t = \log \frac{f_1(x_t)}{f_0(x_t)}$$

is the log-likelihood ratio at time t, $S_0=0$, and $h_c$ is a decision threshold, selected in a way to satisfy a given false alarm constraint.

Considering $l_t$ as a statistical evidence for anomaly, the CUSUM algorithm continues accumulating it, and declares an anomaly the first time the accumulated evidence $S_t$ exceeds a threshold $h_c$, that is chosen sufficiently large for reliable detection. CUSUM requires the complete knowledge of the probability distributions of $f_0$ and $f_1$. However, in real-world applications, the true probability distributions are typically unknown. Even when $f_0$ and $f_1$ are known up to their parameters, and the parameters are estimated using the maximum likelihood approach, the procedure know an Generalized CUSUM (G-CUSUM) achieves only asymptotic optimality. Moreover, CUSUM, and in general parametric methods, are limited to the detection of certain anomaly types whose true probability distribution matches the assumed $f_1$ well.

In high-dimensional problems that require multivariate analysis, estimating the nominal probability distribution is typically not tractable, especially when the data dimensions are heterogeneous, e.g., environmental sensor data consisting of wind speed, direction, air temperature, pressure, humidity, weather condition (whether it is rainy, sunny or cloudy), etc. Considering the wide range of possible anomalies, it is even more intractable to estimate the anomaly probability distribution. In such problems, knowing the probability distributions and parameters is highly complicated, if not impossible, limiting the applicability of CUSUM and parametric methods in general.

The inventors recently proposed a kNN-based sequential anomaly detection method called Online Discrepancy Test (ODIT) and applied it to cyber-attack detection in smart grid and intelligent transportation systems. In the following description, the inventors first elaborate on the motivation behind ODIT, then present a modification for ODIT to prove its asymptotic optimality in the minimax sense under certain conditions, extensively analyze its computational complexity, propose an extension of ODIT for the cases where training data is available for some anomaly settings, introduce a unified framework for the proposed ODIT detectors and finally, provide a simulation study to exemplify the timely and accurate detection by the proposed detectors under a challenging scenario in which univariate methods fail.

The rationale behind using kNN distance for anomaly detection is the similarity between the inverse kNN distance and likelihood. Specifically, for $f(x_i) \geq f(x_j)$, $x_i, x_j \in X$, it is expected that the distance $g_k(x_i)$ of $x_i$ to it kth nearest neighbor in X is smaller than that of $x_j$. This probability increases with the size of X, i.e., $\lim_{|X|\to\infty} P(g_k(x_i) \leq g_k(x_j))$ =1. This in turn provides grounds for using the difference of kNN distances in ODIT to approximate the log-likelihood ratio of $l_t$.

Figure 2A:
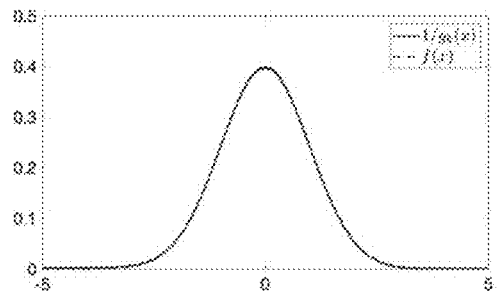
FIG. 2A illustrates similarities between inverse kNN distance $1/(g\_k(x))$ and likelihood $f(x)$ for $k=1$ in a Gaussian distribution.
Figure 2B:
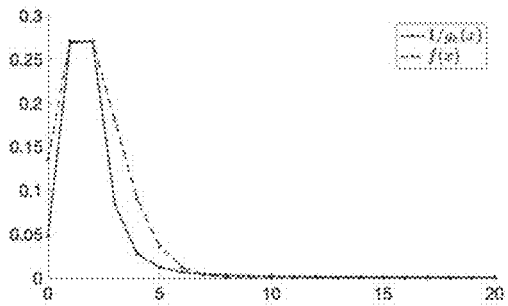
FIG. 2B illustrates similarities between inverse kNN distance $1/(g\_k(x))$ and likelihood $f(x)$ for $k=1$ in a Poisson distribution.
Figure 2C:
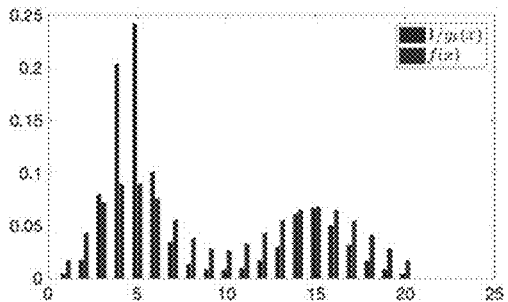
FIG. 2C illustrates similarities between inverse kNN distance $1/(g\_k(x))$ and likelihood $f(x)$ for $k=1$ in a multinomial distribution.
Figure 2D:
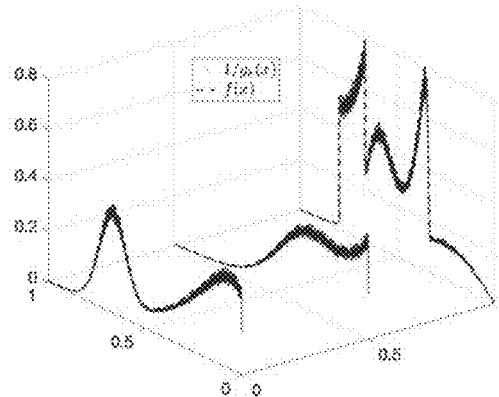
FIG. 2D illustrates similarities between inverse kNN distance $1/g\_k(x)$ and likelihood $f(x)$ for $k=1$ in a complex 2d distribution.

The similarity between the likelihood of data points and the inverse kNN distance is shown in FIG. 2A-FIG. 2D, for several distributions. Gaussian, Poisson and multinomial distributions are considered to illustrate the similarity of $1/g_k(x)$ and $f(x)$ for three disparate data types, real-valued numeric, integer-valued numeric and categorical, respectively. The inverse kNN distance graphs are scaled down to match the likelihood figure for the purpose of visualization. As shown in FIG. 2A, with $|X|=106$, the inverse of kNN distance approximates the likelihood very well for the standard Gaussian random variable. Despite some discrepancy for the Poisson and multinomial cases, due to the discreteness of these random variables, it may still serve well the purpose of approximating the log-likelihood ratio. For these discrete cases, to avoid zero kNN distance, one can consider much smaller number of data points, 10 and 50 for Poisson and multinomial, respectively. FIG. 2B and FIG. 2C are obtained by averaging over $5\times10^5$ and $10^4$ trials, respectively. In order to show the similarity for a more complex distribution, in FIG. 2D a two-dimensional vector of a categorical random variable is considered and a real-valued random variable with arbitrary distribution and $10^4$ data points.

Figure 3:
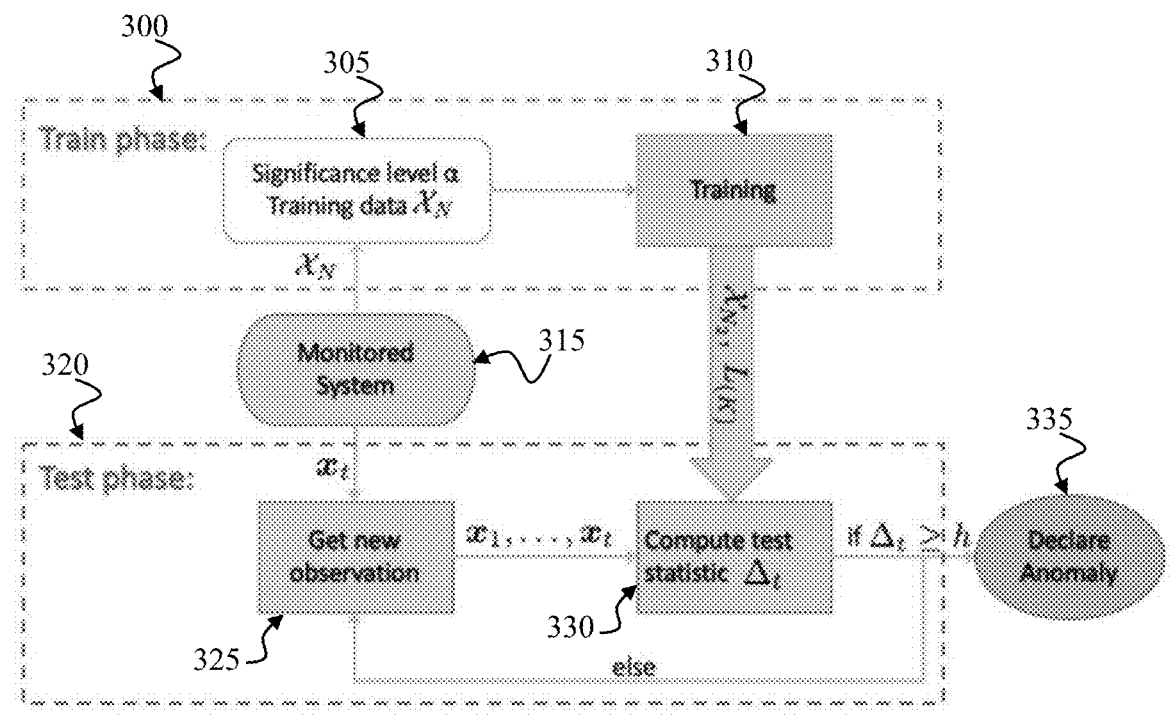
FIG. 3 is a diagram illustrating an overview of the Online Discrepancy Test (ODIT) anomaly detection mechanism, in accordance with an embodiment of the present invention.

The overview of the ODIT detector is illustrated in FIG. 3. In the training phase 300, assuming a training set $X_N$ consisting of N nominal data instances from a monitored system 315, it firstly partitions $X_N$ into two sets $X_{N_1}$ and $X_{N_2}$, where $N_1+N_2=N$, for computational efficiency as in the bipartite GEM algorithm. Then, during the training 310 and based upon a significance level and training data $X_N$ 305 and using the kNN distances $\{g_k(x_m)\}$ between each node $x_m \in X_{N_1}$ and its k nearest neighbors in $X_{N_2}$, ODIT finds an estimate $\hat{\Omega}_\alpha$ for the minimum volume set (MVS) $\Omega_\alpha$ given by $$\Omega_\alpha = \underset{A}{\operatorname{argmin}} \int_A dx \text{ s.t.} \int_A f_0(x)dx \geq 1-\alpha, \qquad (5)$$

where $\alpha \in (0,1)$ is a significance level, e.g., 0.05. $\Omega_\alpha$ represents the most compact set of observations under nominal operation while its complement $\overline{\Omega}_\alpha$ corresponds to the tail events (i.e., outliers) under nominal operation at significance level $\alpha$. Then, in the test phase, it compares the kNN distances $g_k(x)$ between a test data instance x and its k nearest neighbors in $X_2$ with $\hat{\Omega}_\alpha$ to compute a negative/positive anomaly evidence for anomaly x and accumulates it over time, for reliable detection. Roughly, the greater $g_k(x)$ is, the less likely x comes from the same distribution $f_0$ as the nominal points. The estimate $\hat{\Omega}_\alpha$ provides a reference to evaluate $g_k(x)$ and compute the negative/positive anomaly evidence for x.

Specifically, in the training phase, to estimate $\hat{\Omega}_\alpha$, ODIT ranks the points in $X_{N_1}$ in the ascending order $\{x_{(1)}, \ldots, x_{(N_1)}\}$ in terms of the total distance $$L_m = \sum_{n=k-1+1}^{k} g_n(x_m)^\gamma, \qquad (6)$$

where $g_n(x_m)$ is the Euclidean distance between point $x_m \in X_{N_1}$ and its nth nearest neighbor in $X_{N_2}$, $s \in [1,k]$ is a fixed number introduced for convenience, and $\gamma > 0$ is the weight.

Next, it picks the first K points $X_{N_1}^K = \{x_{(1)}, \ldots, x_{(K)}\} \subset X_{N_1}$ with the smallest total distances $\{L_{(1)}, \ldots, L_{(K)}\}$ to estimate the MVS $\Omega_\alpha$, i.e., $\hat{\Omega}_\alpha = X_{N_1}^K$. It is known that $X_{N_1}^K$ converges to $\Omega_\alpha$ as $$\lim_{K, N_1 \to \infty} K/N_1 \to \alpha.$$

Hence, K is chosen as $K=[N_1(1-\alpha)]$, where $\lfloor . \rfloor$ is the floor operator.

In the test phase 320, for each data instance $x_t$ (observation) 325, ODIT firstly computes the total distance $L_t$ with respect to the second training set $X_{N_2}$, as in (6). Then, it computes the anomaly evidence, which could be either positive or negative, by comparing $L_t$ with the MVS model found in the training phase through the borderline total distance $L_{(K)}$ $$D_t = d(\log L_t - \log L_{(K)}), \qquad (7)$$

where d is the number of data dimensions. Finally, it updates a detection statistic $\Delta_t$ which accumulates the anomaly evidence $D_t$ over time 330, and raises an anomaly alarm 335 the first time $\Delta_t$ crosses a predefined threshold, $$\Delta_t = \max\{\Delta_{t-1}+D_t, 0\}, \Delta_0=0,$$

$$T = \min\{t: \Delta_t \geq h\}, \qquad (8)$$

which is a CUSUM-like procedure (cf. (4)). The ODIT procedure is summarized in Algorithm 1.

| Algorithm 1 The proposed ODIT procedure |
|---|
| 1: Input: $\chi_N$, k, s, $\alpha$, h |
| 2: Initialize: $\Delta \leftarrow 0$, $t \leftarrow 1$ |
| 3: Training phase: |
| 4: Partition $\chi_N$ into two sets $\chi_{N_1}$ and $\chi_{N_2}$ |
| 5: For each $x_m \in \chi_{N_1}$ compute $L_m$ as in (6) |
| 6: Find $L_{(K)}$ by selecting the Kth smallest $L_m$ |
| 7: Test phase: |
| 8: while $\Delta < h$ do |
| 9:    Get new data $x_t$ and compute $D_t$ as in (7) |
| 10:   $\Delta = \max\{\Delta + D_t, 0\}$ |
| 11:   $t \leftarrow t + 1$ |
| 12: Declare Anomaly |

The computation of the anomaly evidence $D_t$ for each test instance $x_t$ has the simpler form $D_t = L_t - L_{(K)}$ in, where the inventors proposed ODIT the first time. Although this simpler form of $D_t$ and the form proposed in equation (7) have similar structures, and they perform quite similarly in practice, the new form given in equation (7) naturally appears while proving the asymptotic optimality of ODIT in the minimax sense, as shown next.

Theorem 1. When the nominal distribution $f_0(x_t)$ is finite and continuous, and the attack distribution $f_1(x_t)$ is a uniform distribution, as the training set grows, the ODIT statistic $D_t$ converges in probability to the log-likelihood ratio, $$D_t \xrightarrow{p} \log \frac{f_1(x_t)}{f_0(x_t)} \text{ as } N_2 \to \infty \qquad (9)$$

i.e., ODIT converges to CUSUM, which is minimax optimum in minimizing expected detection delay while satisfying a false alarm constraint.

Proof: Consider a hypersphere $S_t \in \mathbb{R}^d$ centered at $x_t$ with radius $g_k(x_t)$, the kNN distance of $x_t$ with respect to the training set $X_{N_2}$. The maximum likelihood estimate for the probability of a point being inside $S_t$ under $f_0$ is given by $k/N_2$. It is known that, as the total number of points grow, this binomial probability estimate converges to the true probability mass in $S_t$ in the mean square sense, i.e., $k/N_2 \xrightarrow{L^2} \int_{S_t} f_0(x) \, dx$ as $N_2 \to \infty$.

Hence, the probability density estimate $$\hat{f}_0(x_t) = \frac{k/N_2}{V_d g_k(x_t)^d},$$

where $V_d g_k(x_t)^d$ is the volume of $S_t$ with the appropriate constant $V_d$ converges to the actual probability density function, $\hat{f}_0(x_t) \xrightarrow{p} f_0(x_t)$ as $N_2 \to \infty$, since $S_t$ shrinks and $g_k(x_t) \to 0$. Similarly, considering a hypersphere $S_{(K)} \in \mathbb{R}^d$ around $x_{(K)}$ which includes k points with its radius $g_k(x_{(K)})$, one sees that as $$N_2 \to \infty, g_k(x_{(K)}) \to 0 \text{ and } \hat{f}_0(x_t) = \frac{k/N_2}{V_d g_k(x_t)^d} \xrightarrow{p} f_0(x_t).$$

Assuming a uniform distribution $f_1(x) = f_0(x_{(K)})$, $\forall_x$, it can be concluded with $$\log \frac{\frac{k/N_2}{V_d g_k(x_{(K)})^2}}{\frac{k/N_2}{V_d g_k(x_t)^2}} = d[\log g_k(x_t) - \log g_k(x_{(K)})] \xrightarrow{p} \log \frac{f_1(x_t)}{f_0(x_t)} \text{ as } N_2 \to \infty,$$

where $L_t = g_k(x_t)$ for $s = \gamma = 1$. For $\gamma$ values different than 1, $D_t$ converges to the log-likelihood ratio scaled by $\gamma$.

Note that ODIT does not train on any anomalous data, i.e., does not use any knowledge of anomaly to be detected. While this generality is an attractive trait, as it allows detection of any statistical anomaly, it also inevitably limits the performance for known anomaly types on which detectors can train. ODIT will be extended to this case with available anomaly information in the following description. In Theorem 1, it is shown that in the lack of knowledge about anomalies, ODIT reasonably assumes an uninformative uniform likelihood for the anomaly case and achieves asymptotic optimality under this assumption in the CUSUM-sense for certain parameter choices.

Remark 1 (Parameter Selection): Due to its sequential nature, the parameters of ODIT either directly or indirectly control the fundamental trade-off between minimizing average detection delay and false alarm rate. Parameters k and s determine how many nearest neighbors to take into account in computing the total distance Lm, given by (6). Smaller k would result in being more sensitive to anomaly, hence supports earlier detection, but at the same time it causes to be more prone to the false alarms due to nominal outliers. Larger k would result in vice versa. s is an auxiliary parameter chosen for further flexibility in this trade-off. s=1 considers only the kth nearest neighbor while s=k sums all the first k nearest neighbors. Similar to k, smaller s makes the algorithm more sensitive to anomaly, but also more prone to nominal outliers. However, the effect of s is secondary to that of k. k and s should be chosen together to strike a balance between sensitivity to anomalies and robustness to nominal outliers. $0 < \gamma < d$ is the weight which determines the emphasis on the difference between distances. Large distance values are emphasized by large $\gamma$ values and suppressed by small $\gamma$ values. The alarm threshold h in (8) directly controls the tradeoff between minimizing detection delay and false alarm rate. Decreasing h will yield smaller detection delays, i.e., earlier detection, but also more frequent false alarms. It is typically selected to satisfy a false alarm constraint. The significance level $\alpha$ is at a secondary role supporting h. For fixed h, larger $\alpha$ would result in a smaller estimated MVS $\hat{\Omega}_\alpha$, which in turn results in smaller detection delays, but also more frequent false alarms since more nominal data points will lie outside the selected MVS. Note that h is the final decision threshold, whereas $\hat{\Omega}_\alpha$ is more of an intermediate parameter. Hence, one can always set $\hat{\Omega}_\alpha$ to a reasonable significance value, such as 0.05, and then adjust h accordingly to satisfy a desired false alarm rate. Regarding the sizes of training sets $N_2$ plays a more important role than $N_1$, as shown in Theorem 1. Specifically, $N_2$ determines the accuracy of likelihood estimates by the kNN distances, whereas $N_1$ determines how well the significance level $\alpha$ is satisfied, which is an intermediate parameter, as discussed before. Hence, typically $N_2$ should be chosen larger than $N_1$, where $N_1 + N_2 = N$. It should be noted that the ODIT procedure, given by Algorithm 1, can also work without partitioning the training set. Partitioning is proposed for computational efficiency when dealing with large high-dimensional datasets. However, it does not decrease the order of magnitude in computational complexity since even without partitioning, the online testing procedure already scales linearly with the number of training instances, as opposed to the bipartite GEM algorithm, which decreases the complexity to linear from exponential using partitioning. As a result, Algorithm 1 can be used without partitioning the training set, especially for small datasets.

Remark 2 (Graph Interpretation): The K points in MVS estimate $X_{N_1}^K$ and their k nearest neighbors in $X_{N_2}$ form a Euclidean kNN graph $\mathcal{G} = (\overline{X}_{N_1}^K, \varepsilon)$, where $\overline{X}_{N_1}^K$ is the set of vertices and $\varepsilon$ is the set of edges connecting $X_{N_1}^K$ to the neighbors in $X_{N_2}$. The constructed graph $\mathcal{G}$ minimizes the total edge length $$\sum_{m=1}^{K} L_m$$

among all possible A-point kNN graphs between $X_{N_1}$ and $X_{N_2}$. The computation of anomaly evidence $D_t$ in equation (7) can then be interpreted as the increase/decrease in the log of total edge length if the K-kNN graph were to include the test point $x_t$.

Remark 3 (Comparisons): ODIT learns $\hat{\Omega}_\alpha$ using kNN distances, similarly to the outlier detection method called Geometric Entropy Minimization (GEM). However, in the test phase, unlike GEM, which declares anomaly even when a single test point falls outside the MVS, ODIT sequentially updates a test statistic $\Delta_t$ using the closeness/remoteness of the test point to the MVS, and declares anomaly only when $\Delta_t$ is large enough, i.e., there is enough anomaly evidence with respect to a false alarm constraint. Doing so, ODIT is able to timely and accurately detect persistent anomalies, as shown theoretically in Theorem 1 and through numerical results, shown below. Whereas, one-shot outlier detectors like GEM are prone to high false alarm rates due to the limitation of significance tests, the sequential detection structure of ODIT resembles that of CUSUM albeit with fundamental differences. Actually, the test statistic of ODIT implements a discrepancy function motivated by the discrepancy theory and discrepancy norm, hence the name Online Discrepancy Test (ODIT). The nonparametric nature of ODIT does not require any knowledge of the nominal and anomaly probability distributions, as opposed to CUSUM. Moreover, the practical relaxations of CUSUM, such as G-CUSUM and independent CUSUM, cannot be applied to challenging scenarios such as high-dimensional systems which require multivariate anomaly detection with little or no knowledge of anomaly types. On the other hand, ODIT scales well to high-dimensional systems for multivariate detection, as discussed below.

In analyzing the computational complexity of the proposed method, the training phase of ODIT requires the kNN distances between each pair of the data points in the two training sets. Therefore, the time complexity of training phase is $O(N_1 N_2 d)$ where d is the data dimensionality. The space complexity of training is $O(N_2 d)$ since $N_2$ points are stored for testing. Note that training is performed once offline, thus the complexity of online testing is usually critical for scalability. In the test phase, computing the kNN distance of a test point among all points in the second training set takes $O(N_2 d)$ time. The space complexity of testing is not significant as the text statistic is updated recursively. Consequently, the proposed ODIT algorithm linearly scales with the data dimensionality d both in training and testing. In the online testing phase, it also scales linearly with the number of training points. For high-dimensional systems, with abundance of training data, the online testing time could be the bottleneck in implementing ODIT.

kNN Approximation: Computing the nearest neighbors of a query point is the most computationally expensive part of the algorithm, as the distance to every other point in the second training data needs to be computed to select the k smallest ones. As the dimensionality increases and the training size grows, the algorithm becomes less efficient in terms of the running time. To this end, it is proposed to approximate the kNN distance rather than computing its exact value. It is natural to expect that ODIT's performance will drop due to the inaccuracy induced by the approximated kNN distances compared to that based on the exact kNN distances. However, depending on the system specifications, e.g., how frequently the data arrives and how critical timely detection is, the reduction in running time through kNN approximation may compensate for the performance loss, as is next analyzed through an experiment. A kNN distance approximation algorithm is proposed that scales well to high-dimensional data. This algorithm performs hierarchical clustering by constructing a k-means tree and approximates the kNN distance by performing a priority search in the k-means tree, i.e., by searching for the k nearest neighbors only among a limited number of data points. The computation complexity of constructing the tree is $$O\left(N_2 d C I_{max} \frac{\log N_2}{\log C}\right),$$

where $I_{max}$ is the maximum number of iterations in k-means clustering, C is the number of clusters (a.k.a. branching factor), and $$\frac{\log N_2}{\log C}$$

is the average height of the tree. Using the priority search k-means tree algorithm, the computational complexity of kNN search reduces to $$O\left(Bd\frac{\log N_2}{\log C}\right), \text{ where } B \ll N_2$$

is the maximum number of data points to examine. Hence, the training complexity reduces to $$O\left((N_1 B + N_2 C I_{max})\frac{\log N_2}{\log C} d\right)$$

from $O(N_1 N_2 d)$. Note that $B \ll N_2$ and the number of iterations required for convergence is small. More importantly, in online testing, the computational complexity per instance decreases to $$O\left(B\frac{\log N_2}{\log C} d\right)$$

from $U(N_2 d)$.

Experiment: The inventors experimented with this approximation in the proposed algorithm. The experiment is done in Matlab on an Intel 3.60 GHz processor with 16 GB RAM. In the experiment, the dimensionality of data is d=50, the training data size is $N=5\times10^5$, partitioned into $N_1=0.38N$ and $N_2=0.62N$, and the anomaly is defined as a shift in the mean of Gaussian observations by 3 standard deviation in 10% of the dimensions. The branching factor for building the priority search k-means tree was set as C=100, and the maximum number of points to examine during search for the k nearest neighbors as B=1000. The average computation time for both ODITs based on the exact and the approximate kNN distance is summarized in the Table I, which presents the time spent for the computation of equation (7) and equation (8) per observation. It is seen that the approximation method drops the average running time per observation of about 1/14 of that of the exact method.

TABLE I

Average computation overhead of original ODIT and efficient ODIT per sample
Average execution time (sec.)

| Exact kNN | Approximate kNN |
|---|---|
| 0.0750 | 0.0054 |

Figure 4:
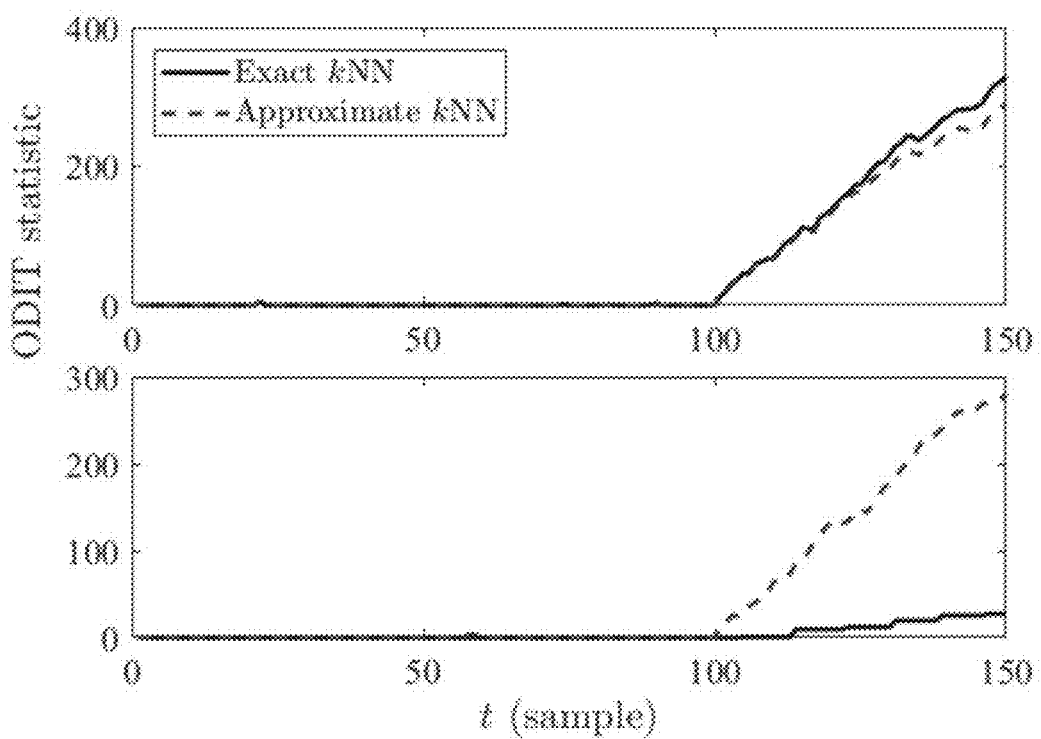
FIG. 4 is a graphical illustration of ODIT statistics based on exact and approximate kNN distances when $T_{sampling}=0.01$ sec. (bottom), in accordance with an embodiment of the present invention.
Figure 5:
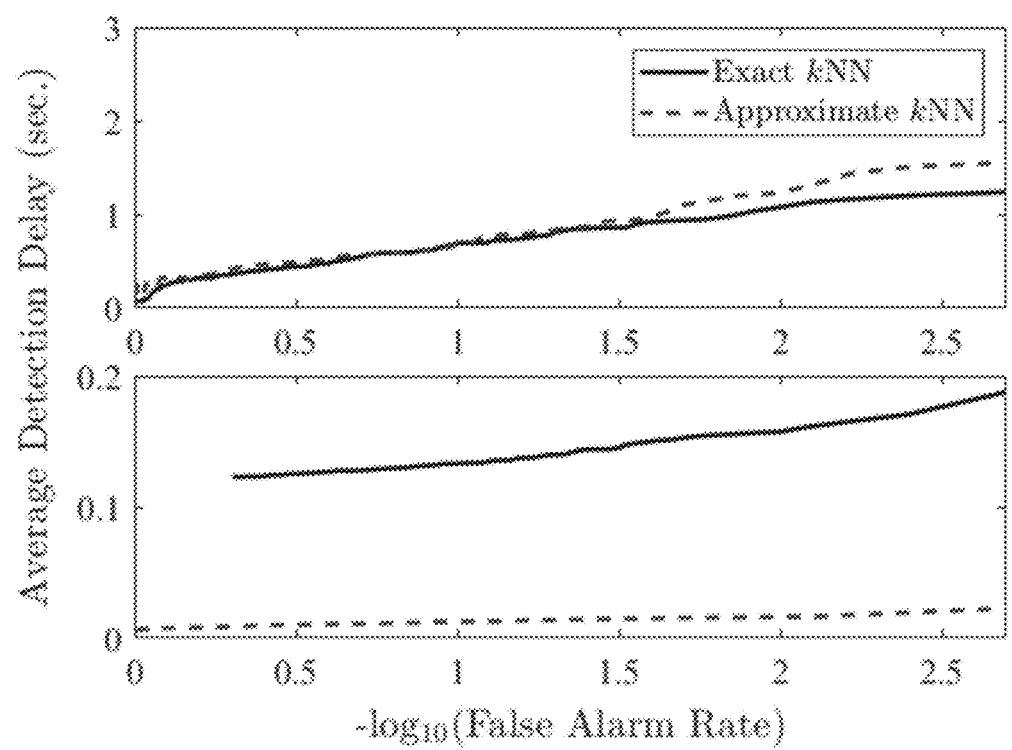
FIG. 5 is a graphical illustration of a comparison between performance of ODIT based on exact and approximate kNN distances in terms of seconds for $T_{sampling}=1$ sec. (top) and $T_{sampling}=0.01$ sec. (bottom), in accordance with an embodiment of the present invention.

To compare the original and efficient ODITs in systems with different specifications, in terms of the frequency of data arrival, the inventors considered the following two scenarios: (i) data arrives every 1 sec., and (ii) data arrives every 0.01 sec. FIG. 4 and FIG. 5 compare the decision statistics and average performance of ODIT based on exact and approximate kNN in the two scenarios. Considering the extra samples needed for detection after the attack onset, as well as the computation time overhead for the last sample before detection, the actual detection delay in time unit is given by sample delay+sample period+computational overhead. Depending on the sampling period, either exact kNN or approximate kNN could be more advantageous. For a sampling period that is smaller than the computation overhead, exact kNN computations are usually not feasible, causing the original ODIT to miss multiple samples while performing the test for a data instance, as can be seen in the staircase statistic in solid blue in the bottom figure of FIG. 4. Therefore, in such a case, approximate kNN computations are preferred over the exact kNN computations in terms of the actual detection delay (see the bottom figure in FIG. 5). Whereas for a sufficiently large sampling period, the delay is mainly due to the extra samples, thus exact kNN computations yield better results this case, as shown in the top figure in FIG. 5.

Summary of ODIT: Here, the prominent features of the proposed ODIT anomaly detector are highlighted:
  The sequential nature of ODIT makes it suitable for real-time systems, and especially for systems in which quick and accurate detection is critical. Additionally, as the nominal training set grows, it asymptotically achieves the minimax optimality in terms of quick and accurate detection when anomaly is from uniform distribution.
  It is capable of performing multivariate detection in high-dimensional systems, thanks to its nonparametric and scalable nature.
  ODIT can detect unknown anomaly types since it does not depend on any assumption about anomalies. Moreover, it is suitable for online learning such that its detection performance can be improved over time for previously encountered anomaly types.

An Extension: ODIT-2: In an additional embodiment section the inventors considered the case of having an additional anomaly training dataset along with the previously discussed nominal dataset. Next, the inventors extend the ODIT method to take advantage of the anomaly dataset in order to improve its performance. With the inclusion of an anomaly training set, the ODIT-2 procedure is akin to the classification methods based on kNN distance. However, these methods are not sequential. Consider an anomaly training set $X_M' = \{x_1', x_2', \ldots, x_M'\}$ in addition to the nominal set $X_N = \{x_1, x_2, \ldots, x_N\}$. In this case, the anomaly evidence for each instance can be computed by comparing the total distance $L_T$ with respect to the nominal dataset with the total distance $L_T'$ with respect to the anomalous dataset. Thus, there is no need to learn the borderline total distance $L_{(K)}$ in training to be used as a baseline for $L_T$ in testing (cf. 7). That is, no training is needed for ODIT-2. However, before testing, a preprocessing might be required to remove the data points that are similar to the nominal train set. The reason for cleaning the anomaly dataset rather than the nominal dataset is that usually anomaly dataset is obtained by collecting observations from a known anomalous event which may typically include nominal observations too. For instance, in a network intrusion detection system (IDS), after occurrence of an attack, several observations could still be of nominal nature. The cleaning step is done by finding and removing the data points of anomaly training set which lie in the estimated MVS of the nominal training set, $$X_M^{clean} = X_m \setminus \{x_m' \in X_m' : L_{x_m'} \leq L_{(K)}\} \quad (10)$$

where $L_{x_m'}$ is the total distance of $x_m'$ with respect to the nominal points in $X_{N_2}$. Hence the training procedure of ODIT, which finds $L_{(K)}$, can be used for preprocessing the anomalous training data.

While testing for each test data instance $x_t$, the anomaly evidence is calculated by $$D_t = d(\log L_t - \log L_t') + \log(N/M), \quad (11)$$

where $L_t$ and $L_t'$ are the total distances of $x_t$ computed using equation (6) with respect to the points $X_{N_2}$ and $X_{M_2}^{clean}$, respectively, and N and M are the number of points in the nominal and (cleaned) anomalous training sets. The statistic update and decision rule of ODIT-2 are the same as in the ODIT, give by equation (8). In the ODIT-2 procedure, different than Algorithm 1, equation (11) is used in line 9 to compute the anomaly evidence $D_t$.

In practice, there is a typical imbalance between the sizes of nominal and anomaly training sets due to the inherent difficulty of obtaining anomaly samples. Since the total kNN distances in dense nominal set $X_N$ are expected to be smaller than those in a sparse anomaly dataset, for an anomalous data point, $L_t$ can be smaller than $L_t'$, resulting in a negative anomaly evidence, which can lead to poor detection. In order to deal with the imbalance of datasets, the term $\log(N/M)$ in equation (11) acts as a correction factor. Specifically, for N>M, $\log(N/M)>0$ compensates for $L_t$ being unfairly small compared to $L_t'$. This correction factor naturally appears in the asymptotic optimality proof as shown next.

Corollary 1. When the nominal distribution $f_0(x_t)$ and anomalous distribution $f_1(x_t)$ are finite and continuous, as the training sets grow, the ODIT-2 statistic $D_t$, given by equation (11), converges in probability to the log-likelihood ratio, $$D_t \xrightarrow{p} \log \frac{f_1(x_t)}{f_0(x_t)} \text{ as } M, N \to \infty, \quad (12)$$

i.e., ODIT-2 converges to CUSUM, which is minimax optimum in minimizing expected detection delay while satisfying a false alarm constraint.

Proof: From the proof of Theorem 1, it is known that $$\frac{k/N}{V_d g_k(x_t)^d} \xrightarrow{p} f_0(x_t) \text{ as } N \to \infty.$$

Similarly, it can be shown that $$\frac{k/M}{V_d g_k'(x_t)^d} \xrightarrow{p} f_1(x_t) \text{ as } M \to \infty,$$

where $g_k'(x_t)$ is the kNN distance of $x_t$ in the anomalous training set $X_M'$. Hence, it can be concluded with $$\log \frac{\frac{k/M}{V_d g_k'(x_t)^d}}{\frac{k/N}{V_d g_k(x_t)^d}} = d[\log g_k(x_t) - \log g_k'(x_t)] + \log(N/M) \xrightarrow{p} \log \frac{f_1(x_t)}{f_0(x_t)} \text{ as } M,$$

$$N \to \infty,$$

where $L_t = g_k(x_t)$ and $L_t' = g_k'(x_t)$ for $s = \gamma = 1$.

Availability of labeled training data is a major limiting factor for improving the performance of anomaly detection techniques. In several applications, obtaining a comprehensive and accurate labeled training dataset for the anomaly class is very difficult. In contrast, in most applications, typically a sufficient amount of comprehensive nominal training data is available. Semi-supervised techniques including ODIT, constitute a popular class of anomaly detection methods that require labeled training data only for the nominal class. These techniques try to build a model of nominal operation/behavior. Hence, anomaly detection is performed by detecting data which significantly deviates from the constructed nominal model. Supervised techniques on the other hand, assume availability of both nominal and anomalous datasets, and build models for classifying unseen data into nominal vs. anomaly classes. ODIT-2, as an example supervised technique, outperforms the semi-supervised ODIT technique for the known anomaly types, as previously described. However, ODIT-2, and in general supervised anomaly detectors, fall short of detecting unknown anomaly types while ODIT, and in general semi-supervised anomaly detectors, can easily handle new anomaly patterns as they do not depend on assumptions about the anomalies.

Combining the strengths of ODIT and ODIT-2, the inventors propose an online learning scheme called ODIT-uni which is capable of detecting new anomaly types and at the same time improving its performance for detecting the previously seen anomaly types. Particularly, in the unified ODIT method, both ODIT and ODIT-2 run in parallel to detect anomalies, and the anomalous data instances first detected by ODIT are included in the anomalous training set of ODIT-2 in order to empower the detection of similar anomaly types. Since the ODIT-2 procedure involves all the necessary elements for ODIT, there is no further computation overhead induced by the unified approach. Keeping track of the cumulative decision statistics of ODIT and ODIT-2 the unified ODIT scheme, ODIT-uni, stops the first time either ODIT or ODIT-2 stops:

$$\Delta_t^{(1)} = \max\{\Delta_t^{(1)} + D_t^{(1)}, 0\}, \Delta_t^{(2)} = \max\{\Delta_t^{(2)} + D_t^{(2)}, 0\},$$

$$T = \min\{t: \Delta_t^{(1)} \geq h_1 \text{ or } \Delta_t^{(2)} \geq h_2\}, \quad (13)$$

where $D_t^{(1)}$ and $D_t^{(2)}$ are the anomaly evidences given by (7) and (11), respectively, and $h_1$ and $h_2$ are the decision thresholds for ODIT and ODIT-2, respectively, For known anomaly patterns on which ODIT-2 is trained, it is expected that $\Delta_t^{(2)} \geq h_2$ happens earlier, whereas $\Delta_t^{(1)} \geq h_1$ is supposed to detect new anomaly types. If the alarm is raised by ODIT, then the anomaly onset time is estimated as the last time instance the ODIT statistic was zero, i.e., $\hat{\tau} = \max\{t < T: \Delta_t^{(1)} = 0\}$, and the data instances $\{x_{\hat{\tau}+1}, \ldots, x_T\}$ between $\hat{\tau}$ and T are added to the ODIT-2 anomaly training set. For reliable enhancement of the ODIT-2 anomaly training set with the newly detected instances, the ODIT threshold $h_1$ needs to be selected sufficiently high to prevent false alarms by ODIT, and thus false inclusions into the ODIT-2 training set. Obviously, large $h_1$ will increase the detection delays for previously unseen anomaly types, however, avoiding false training instances is a more crucial objective.

Figure 6A:
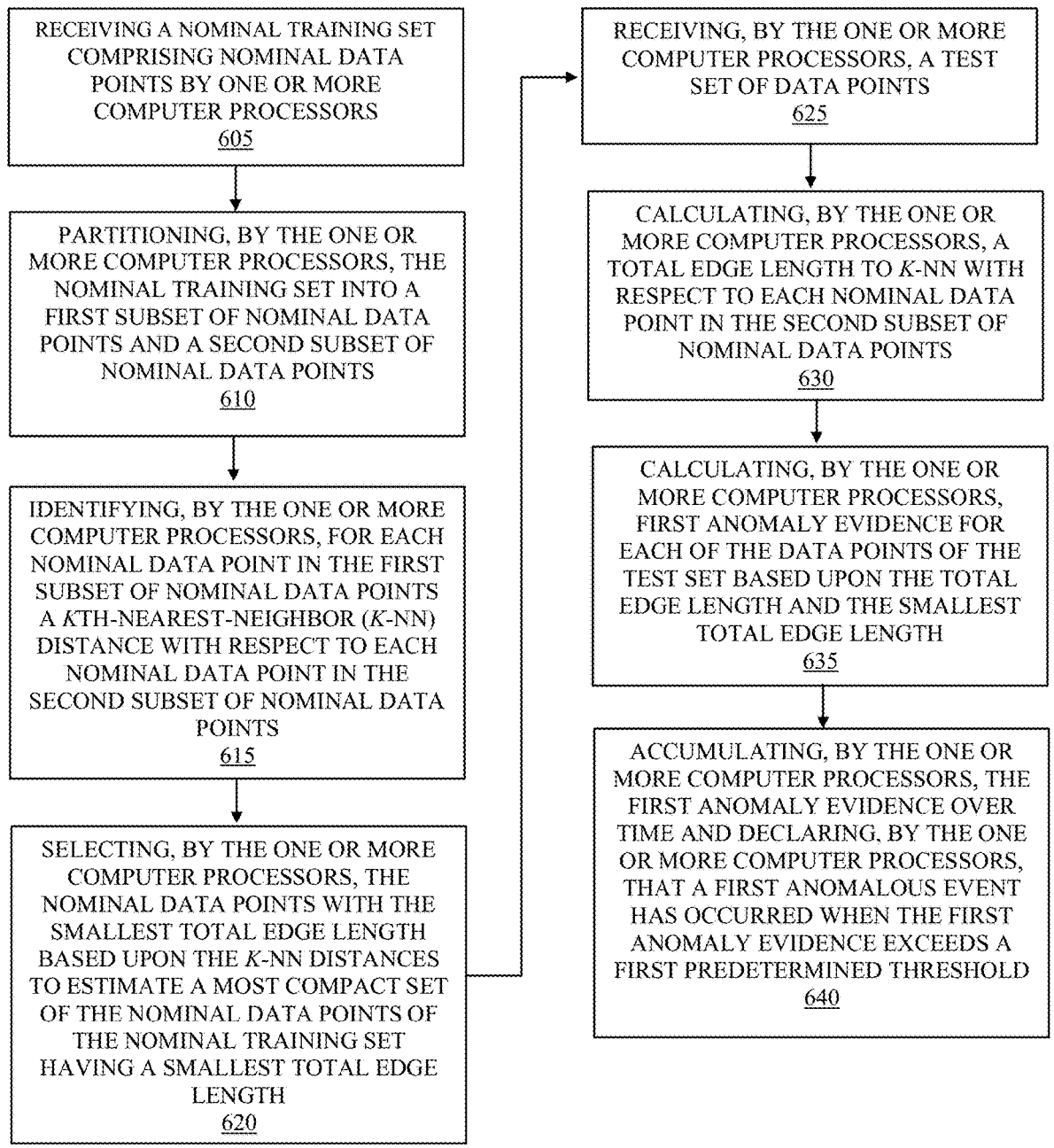
FIG. 6A is a flow diagram illustrating a first embodiment of a method for detecting and localizing anomalous events based on nominal training data, in accordance with an embodiment of the present invention.

With reference to the flow diagram illustrated in FIG. 6A, in one embodiment, the present invention provides a computer implemented method for data anomaly detection. In one embodiment, the method utilizes a nominal training set for detecting and localizing data anomalies transmitted over a network. The training phase utilizing a nominal training set begins at step 605 wherein the method includes receiving a nominal training set comprising nominal data points by one or more computer processors. At step 610, the method continues by partitioning, by the one or more computer processors, the nominal training set into a first subset of nominal data points and a second subset of nominal data points. The method continues at step 615 by identifying, by the one or more computer processors, for each nominal data point in the first subset of nominal data points a kth-nearest-neighbor (k-NN) distance with respect to each nominal data point in the second subset of nominal data points and at step 620 by selecting, by the one or more computer processors, the nominal data points with the smallest total edge length based upon the k-NN distances to estimate a most compact set of the nominal data points of the nominal training set having a smallest total edge length. A testing phase begins at step 625 wherein the method includes, receiving, by the one or more computer processors, a test set of data points and at step 630 by calculating, by the one or more computer processors, a total edge length to k-NN with respect to each nominal data point in the second subset of nominal data points. The method continues at step 635 by calculating, by the one or more computer processors, first anomaly evidence for each of the data points of the test set based upon the total edge length and the smallest total edge length. At step 640 the method concludes by accumulating, by the one or more computer processors, the first anomaly evidence over time and by declaring, by the one or more computer processors, that a first anomalous event has occurred when the first anomaly evidence exceeds a first predetermined threshold.

Figure 6B:
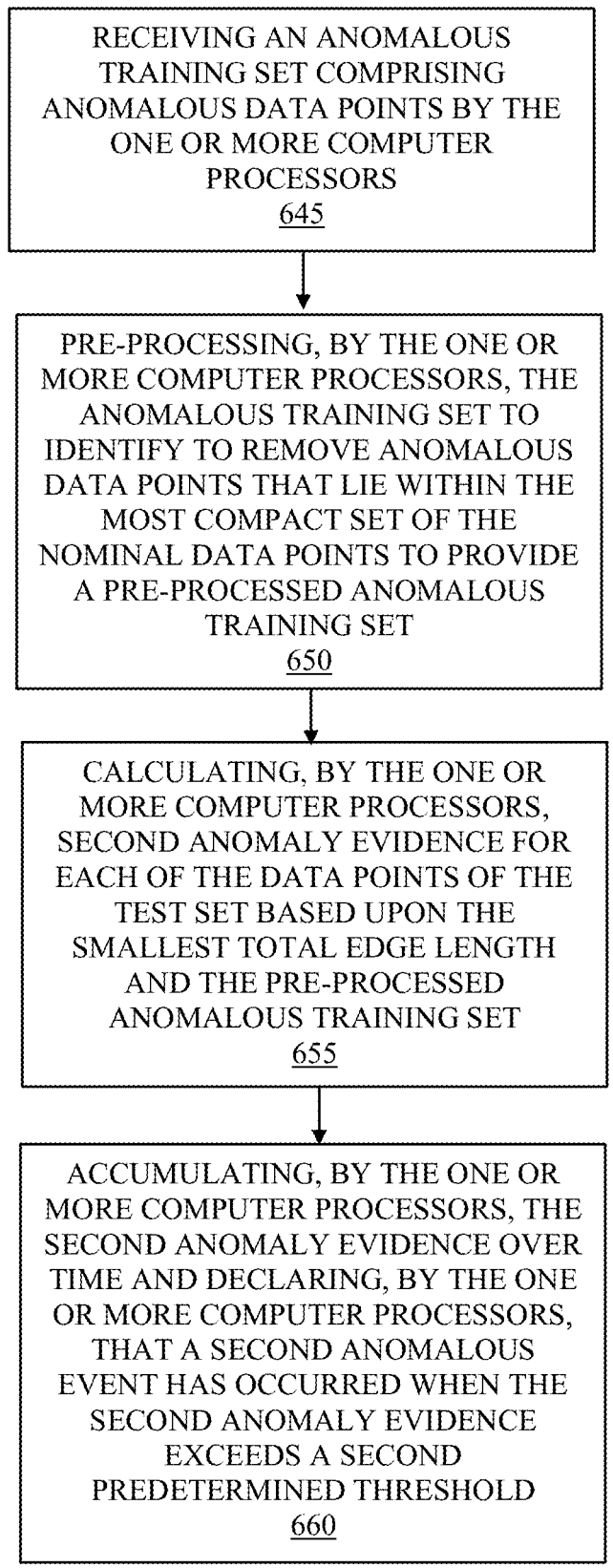
FIG. 6B is a flow diagram illustrating a second embodiment of a method for detecting and localizing anomalous events based on anomalous training data, in accordance with an embodiment of the present invention.

With reference to FIG. 6B, in an additional embodiment, a method is provided which also tests the data points utilizing an anomalous data set, wherein at step 645 the method begins by receiving an anomalous training set comprising anomalous data points by the one or more computer processors and continues at step 650 by pre-processing, by the one or more computer processors, the anomalous training set to identify to remove anomalous data points that lie within the most compact set of the nominal data points to provide a pre-processed anomalous training set. At step 655 the method continues by calculating, by the one or more computer processors, second anomaly evidence for each of the data points of the test set based upon the smallest total edge length and the pre-processed anomalous training set. The method concludes at step 660 by accumulating, by the one or more computer processors, the second anomaly evidence over time and declaring, by the one or more computer processors, that a second anomalous event has occurred when the second anomaly evidence exceeds a second predetermined threshold.

As previously described the methods illustrated in FIG. 6A and FIG. 6B can be performed in parallel and a combined method may include updating the anomalous training set based upon anomalous events declared with the nominal training set. In particular, the nominal training set and the anomalous training set may be received in parallel and the step of declaring, by the one or more computer processors, that a first anomalous event has occurred and the step of declaring, by the one or more computer processors, that a second anomalous event has occurred are performed in parallel.

Figure 7:
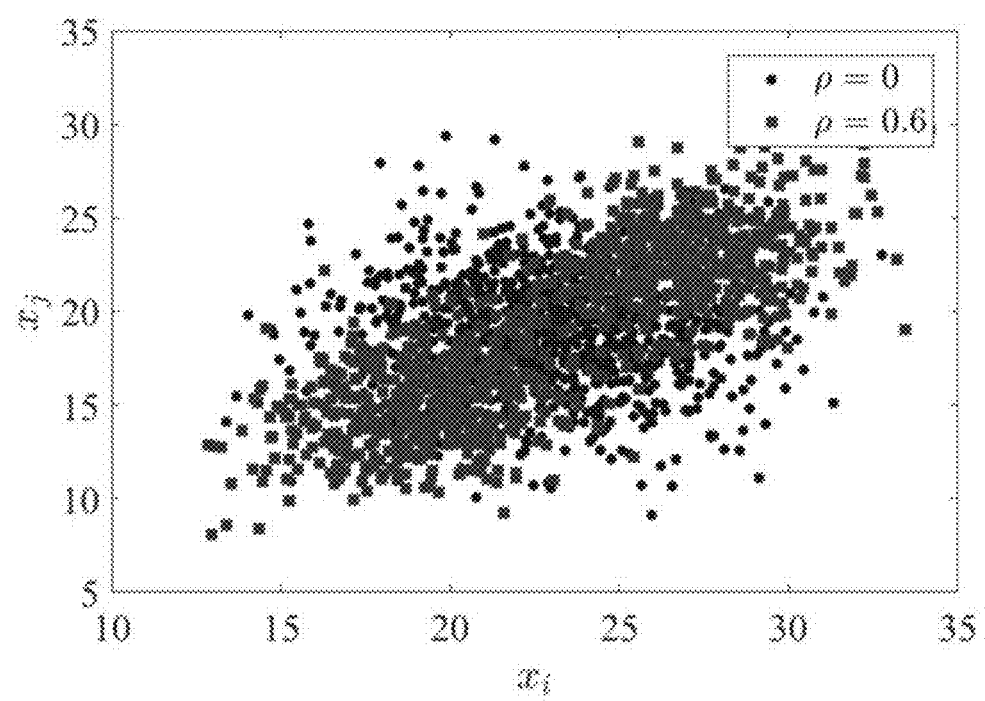
FIG. 7 is a diagram illustrating a change in correlation, in accordance with an embodiment of the present invention.

The nonparametric nature of the proposed ODIT detectors makes them suitable for multivariate detection in high-dimensional and heterogeneous systems. Through an exemplary embodiment, the advantage of ODIT and ODIT-2 over the parametric G-CUSUM detector is illustrated in a challenging setting where anomaly is manifested as a change in the correlation between the individual data streams. This type of anomaly is well exemplified by the MadIoT attacks, in which high wattage IoT devices, such as air conditioners and water heaters, are synchronously turned ON/OFF to cause instability, and as a result, a blackout in the power grid. In this exemplary embodiment, a 100-dimensional system is simulated that generates data following a multivariate Gaussian distribution with $\mu=20$ and $\sigma=10$ for the individual data streams, which initially have no correlation. At time $t=100$, the covariance matrix of the observations is changed by randomly adding $\rho=0.6$ correlation between 50% of the data streams without any change in the mean and variance (i.e., diagonal terms in the covariance matrix). FIG. 7 demonstrates the change in the distribution of two data dimensions. For better visualization, some of the anomaly instances that overlap with the nominal instances are not shown. $N=2\times10^4$ nominal training instances, and $M=2\times10^4$ anomalous training instances were used, which decreased to $M=4836$ after cleaning, for a scenario in which 50% of the data dimension become correlated with $\rho=0.6$.

Figure 8:
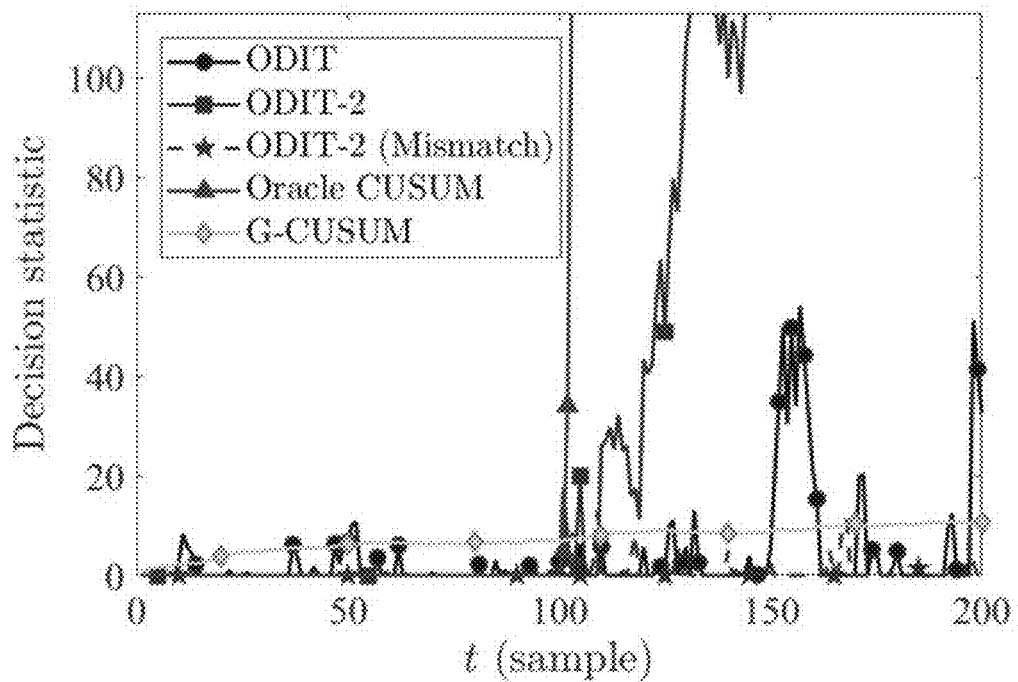
FIG. 8 is a graphical illustration of decision statistics of ODITs vs. G-CUSUM and Oracle CUSUM in a correlation monitoring example.
Figure 9:
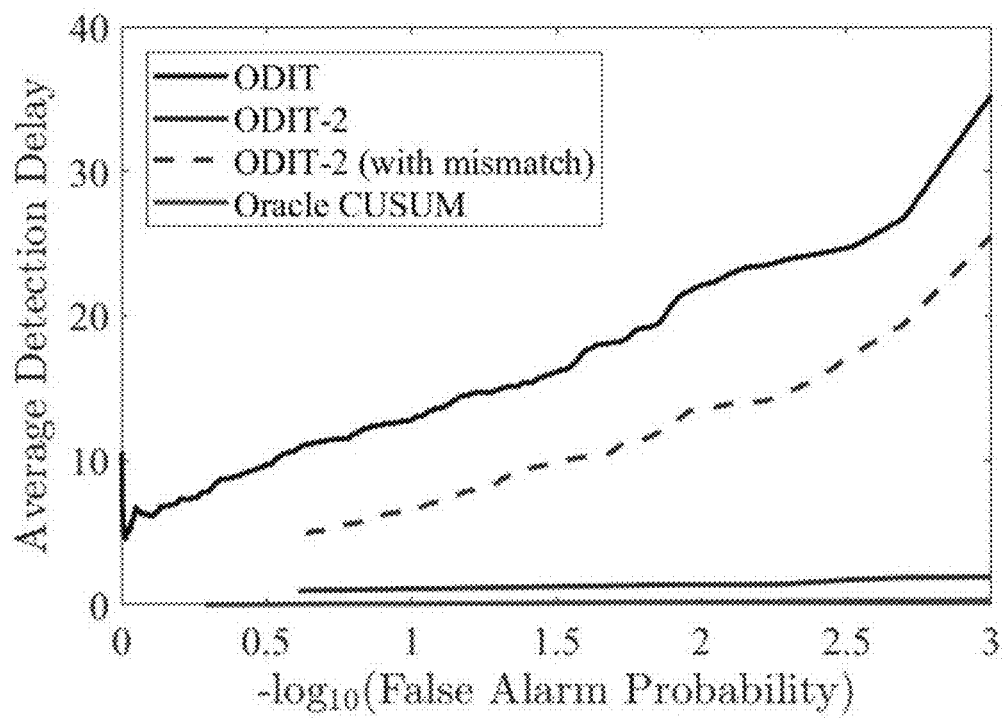
FIG. 9 is a graphical illustration of performance comparison for ODITs in a correlation monitoring example.

In this experiment, a comparison is made between the performance of ODIT algorithms and the G-CUSUM and Oracle CUSUM, which exactly knows the nominal and anomalous probability distributions. This is a challenging problem due to the fact that the mean and variance of individual data-streams does not change. In particular, some data instances after the anomaly onset are still very similar to the nominal instances. To cope with the similarity of the anomaly instances to the nominal ones, the parameters of ODIT algorithms are set to be $k=s=\gamma=1$, $\alpha_1=0.2$, $\alpha_2=0.005$, and the cleaning step is performed on the anomaly training set for ODIT-2. As depicted by its ever-increasing statistic in FIG. 8, G-CUSUM fails to detect anomalies since it is not able to monitor correlations. Whereas, the ODIT algorithms successfully detect the change in the covariance structure of observations by performing multivariate analysis, as shown in FIG. 9. Since ODIT does not use any anomaly data in training, it detects the anomaly with larger delays compared to ODIT-2. This example provides a scenario where the availability of a set of previously encountered instances greatly helps ODIT-2 to perform significantly better. ODIT-2 achieves a close performance to the impractical Oracle CUSUM algorithm in the ideal case in which the anomalous dimensions in the test matches the ones in the training. To demonstrate that ODIT-2 is still able to operate reasonably well under non-ideal conditions, the inventors tested it for the case where there is a mismatch between the test and train data in terms of the set of data-streams getting correlated. In this case, 27 out of the 50 dimensions getting correlated are not seen in the anomaly train data. FIG. 9 shows that despite the mismatch, ODIT-2 still performs better than ODIT.

In another exemplary embodiment, a localization strategy is proposed to identify the data dimensions in which the detected anomaly occurs so that necessary steps can be taken to mitigate the anomaly. Specifically, after an anomaly is detected in ODIT, the objective is to identify the dimensions that caused the detection statistic $\Delta_t$ to increase considerably and ultimately resulted in the detection. The approach to perform this task is by examining the contribution of each dimension individually to the decision statistics. In the case of detection by ODIT, an increase in the total distance $L_t$, given by (6), leads to an increase in the anomaly evidence $D_t$, given by (7), finally leading to an increase in the detection statistic $\Delta_t$, given by (8), and consequently the anomaly alarm. Assuming that $x_t$ is the test data instance, and $\{y_1, \ldots, y_k\}$ are its k nearest neighbors in the train set. The total kNN distance $$L_t = \sum_{i=1 n=k-s+1}^{k} \|x_t - y_n\|^\gamma, \text{ for } \gamma = 2,$$

can be written in terms of the d data dimensions as $$L_t = \sum_{i=1}^{d} \delta_t^i, \text{ where } \delta_t^i = \sum_{n=k-s+1}^{k} (x_t^i - y_n^i)^2, \quad (14)$$

and $x_t^i$ and $y_n^i$ are the ith dimensions of the observations $x_t$ and its nth nearest neighbor $y_n$. $\delta_t^i$ is the contribution of ith dimension of the observation $x_t$ at time t to the detection statistic. Therefore, by analyzing $\delta_t^i$ for each dimension i during the final increase period of $\Delta t$, which causes the anomaly alarm, one can identify the dimensions in which anomaly has been observed. To this end, it is proposed to use a recent history of $Q_i = \{\delta_q^i : q = \hat{\tau}+1, \ldots, \hat{\tau}+S, \forall_i\}$ since the last time $\Delta_q = 0$. This time $\hat{\tau}$, the most recent time instance when the detection statistic was zero, can be seen as an estimate of the anomaly onset time. Finally, a t-test is applied on the S samples in Q to decide whether each dimension i is anomalous.

In particular, it is proposed that the following anomaly localization procedure after the alarm is raised at time T:
1) Find $\hat{\tau} = \max\{t < T: \Delta_t = 0\}$
2) Compute the sample mean and sample standard deviation of $Q_i$ for each dimension i:

$$\overline{\delta}_i = \frac{1}{S} \sum_{t=\hat{\tau}+1}^{\hat{\tau}+S} \delta_t^i \text{ and } \eta_i = \sqrt{\frac{1}{S-1} \sum_{t=\hat{\tau}+1}^{\hat{\tau}+S} (\delta_t^i - \overline{\delta}_i)^2} \quad (15)$$

3) Identify the anomalous dimensions by applying a t-test: if $$\frac{\overline{\delta}_i - \mu_i}{\eta_i / \sqrt{S}} \geq \theta,$$

then dimension i is anomalous, where $\mu_i$ is the sample mean of nominal training $\{\delta_1^i, \ldots, \delta_N^i\}$ values, and $\theta$ is the $(1-\beta)$th percentile, for significance level $\beta$, of Student's t-distribution with S−1 degrees of freedom.

The significance level $\beta$, for which a typical value is 0.05, controls a balance between sensitivity to anomalies and robustness to nominal outliers. For given $\beta$ and S values, the threshold $\theta$ can be easily found from a lookup table for Student's t-distribution (e.g., $\theta=6.314$ for $\beta=0.05$ and S=2). The number of samples S needs to be at least 2 to have a degree of freedom at least 1. In practice, t-test is commonly used for small sample sizes, therefore S does not need to be large. Indeed, larger S would cause longer reaction time since the localization analysis would be performed at time $\hat{\tau}+S$, which could be greater than the detection time T, incurring extra delay for localization and reaction after detection.

Localization by ODIT-2 is slightly different. Since log $L_{(K_N)}$ and log $L_{(K_M)}'$ are constant, the increase that causes the alarm takes place in log $L_t$–log $L_t'$. Writing $L_t$ and $L_t'$ in terms of the contributions from the d dimensions, $\delta_1^i$ and $\delta_1^{i\prime\prime}$, respectively as in (14), the increase in the difference $(\delta_1^i - \delta_1^{i\prime\prime})$ for some i leads to the increase in the decision statistics. Similar to ODIT, firstly $\hat{\tau}$ is found after a detection. Then, in the second step, the $\overline{\delta}^i$ and $\eta_i$ are computed by replacing $\delta_1^i$ with $(\delta_1^i - \delta_1^{i\prime\prime})$ in (15). Finally, in the third step $\mu_i$ corresponds to the sample mean of nominal training $\{(\delta_1^i - \delta_1^{i\prime\prime}), \ldots, (\delta_{N_1}^i - \delta_{N_1}^{i\prime\prime})\}$ values.

Distributed Denial-of-Service (DDOS) attack is a major security problem in today's widely-networked systems and requires effective solution approaches. DDOS attack is traditionally known as a type of cyber-attack targeting an Internet service, with the intention of making is unavailable for the legitimate users. Nevertheless, it has also been recently investigated in the cyber-physical systems domain, such as the smart grid. DDOS attack is typically performed by overwhelming the target with malicious requests from multiple geographically distributed sources. The attacker first builds a network of malicious devices known as "botnet" by infecting them with malware, and then remotely controls these devices to synchronously send some form of service requests to the target, which initiates a DDOS attack. The size of botnet, both in the number of compromised devices and geographical distribution, determines the threat level of a DDOS attack. It is extremely difficult to successfully mitigate a large-scale DDOS attack centrally at the attacked site without disrupting the regular service to legitimate users, as recently demonstrated by the massive DDOS attacks empowered by Internet-of-things (IoT) devices.

Low-Rate DDOS: The proliferation of IoT devices exacerbates the DDOS attack problem as many IoT devices, such as Internet-connected sensors, have low security measures, making them vulnerable to malware infections. Abundance of low-security IoT devices worldwide enables an even more challenging new type of DDOS attack, called low-rate DDOS, which is considered a stealth attack since the amount of anomalous service requests from each compromised device can be quite low. Such low-rate change in the device behavior can easily bypass local intrusion detection systems (IDSs) that rely on observing raw data, such as data filters and firewalls. Yet, a synchronous low-rate DDOS attack from huge number of compromised devices, e.g., millions of IoT devices, can easily cause an overwhelming aggregated service request, and thus the failure of target. Successful DDOS attack mitigation requires quick detection of attack, and accurate identification of sources of malicious requests so that appropriate counter-measures can be taken against the attack. The timely detection of low-rate DDOS attacks is quite challenging at the local level, e.g., at the routers close to IoT devices. Although detection is trivial at the target due to the overwhelming aggregated service requests, accurate identification of attacking nodes and as a result mitigation of the DDOS attack in a centralized fashion is not tractable.

Challenges: There are several challenges for mitigating low-rate DDOS attacks. (i) High-dimensionality: DDOS attacks inherently relate to large-scale systems. Therefore, the proposed methods need to scale well to large systems. Particularly, for low-rate DDOS attacks, timely and accurate detection at a local level is challenging due to the similarity of attack behavior to the nominal behavior. Multivariate anomaly detection techniques can greatly facilitate timely and accurate detection, however even in a local IoT network, dimensionality, i.e., number of devices, makes joint probability density estimation intractable for parametric methods. (ii) Heterogeneity: The heterogeneous nature of IoT results in complex probability distributions even under nominal settings. Each device type in the network has different usage characteristics. For instance, it is expected for computer, phone, smartwatch and temperature sensor in a network to have different operational baselines. Furthermore, even the nominal probability distribution of a single device is usually complicated due to its different operation modes, such as active use, passive use at the background, and hibernation. (iii) Unknown attack types: Due to the myriad of vulnerabilities in a network of low-security IoT devices, it is not possible to know future attack patterns. The conventional signature-based IDSs are not effective since they can only detect a predefined set of attack patterns. For the same reason, parametric detection techniques which assume probabilistic models for anomalies are not feasible as well. To be able to detect unknown anomaly types, a nonparametric detection method is needed.

Application of ODIT: Considering the challenges mentioned above ODIT provides an effective local DDOS attack mitigation approach that can handle high-dimensionality, heterogeneity, and unknown attack types for quick and accurate detection. Utilizing the hierarchical structure of large-scale systems, such as the Internet and the power distribution network, multiple ODITs running at local level, such as routers and data aggregators, can provide a complete IDS for DDOS attack mitigation. Since ODIT is a generic anomaly detection method, we do not specify the observed data type, i.e., service request, in the following simulations for DDOS mitigation. For instance, following the commonly used DDOS concept in computer networks (e.g., flooding-based DDOS) the observed data vector could be the number of packets in unit time, such as packets per second, from a number of devices in the network, or considering a power delivery network, the observed data dimensions could be the power demand from houses.

A. Compared Methods

The inventors compare the performance of the proposed methods with two state-of-the-art detection methods for DDOS attacks. The information metric-based method, and the deep autoencoder method are used for comparison in the simulation and real dataset, as described below. The latter was proposed in the paper that presented the N-BaIoT dataset, thus it is used to evaluate the performance of the proposed ODIT detectors on this dataset. The former is a window-based method that assumes Gaussian distribution for the nominal data, and Poisson distribution for the attack data. Specifically, in the training phase, it fits a Gaussian distribution to a nominal dataset, and then in the test phase it fits a Poisson distribution to a window of samples. By sliding the window and updating the Poisson distribution at each time it computes its detection statistic as $$D\alpha(P,Q)=D\alpha(P\|Q)+D\alpha(Q\|P) \quad (17)$$

where P and Q are the estimated Gaussian and Poisson distributions, and Da (P||Q) is the Renyi divergence between P and Q with parameter a $\alpha\in(0,\infty)$. Since this method is window-based, its performance is highly dependent on the choice of the window size. For small window size, the accuracy of the probability distributions would not be good, resulting in poor performance, while large window size would increase the detection delay, as the attacks can only be detected at the end of the initial window. In the worst scenario assuming that the window size is W and anomaly starts at the beginning of the window, the detection delay would be at least W. Moreover, for large window size, it would take more time to see the effect of attack in the estimated Poisson distribution, and thus longer detection delays. This method is designed to capture the increase in the average data rate with respect to the average in the training dataset. The proposed methods are also compared with the conventional data filtering method that filters out the service requests, in particular data packets, from nodes whose number in a certain period (e.g., packet rate) exceeds a predefined threshold.

B. Experiment on Simulated Data:

In the first experiment, as part of a low-rate DDOS attack scenario, an IoT network with d=50 devices of different types was simulated, each having different nominal data transmission rates. Although the N-BaIoT dataset used is also collected from a similar IoT network, the attack magnitudes (i.e., increase in the data rates) are significantly higher than what are considered as low-rate DDOS here. This simulation study is performed to investigate a low-rate DDOS attack scenario in larger IoT networks. For example, the nominal data rate of a temperature sensor is considerably lower than that of a surveillance camera or a computer. In this simulation setup, 30% of the devices have two modes of operation, active and inactive states, with higher data rates in the former. The rest of the devices have a single baseline representing the background traffic in practical networks. The data rates of each device are generated independently from each other from a Gaussian distribution. For a device, data rates over time are independent and identically distributed. The mean data rates are chosen randomly in [10, 50] for inactive states, in [50, 90] for active states, and in [10,100] for the devices with single states. The same variance $\sigma^2=5$ is used for all devices. Note that data rates of the bimodal devices with active and inactive states follow a mixture of two Gaussian distributions. The frequency of active and inactive states are set to be equal. Assume that an attacker initiates a DDOS attack at time $\tau=101$ through several compromised devices present in the network. When an attack starts, the compromised devices start sending data at a higher rate with a 5 standard deviation increase.

Figure 10:
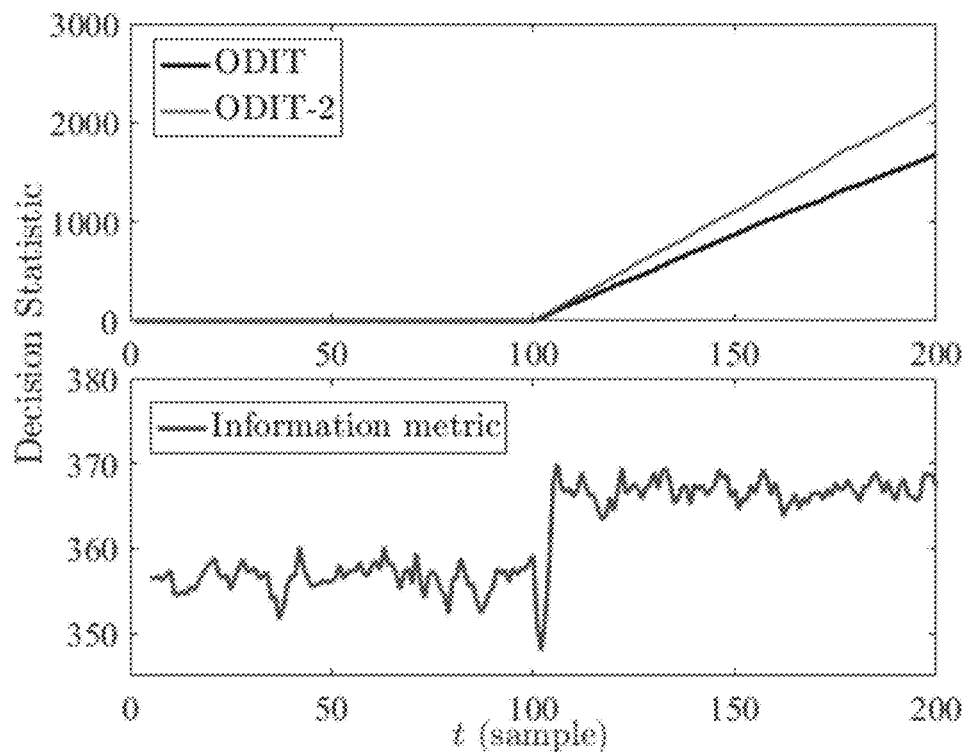
FIG. 10 is a graphical illustration of decision statistics of ODIT, ODIT-2 and the information metric-based method in a DDOS simulation study.
Figure 11:
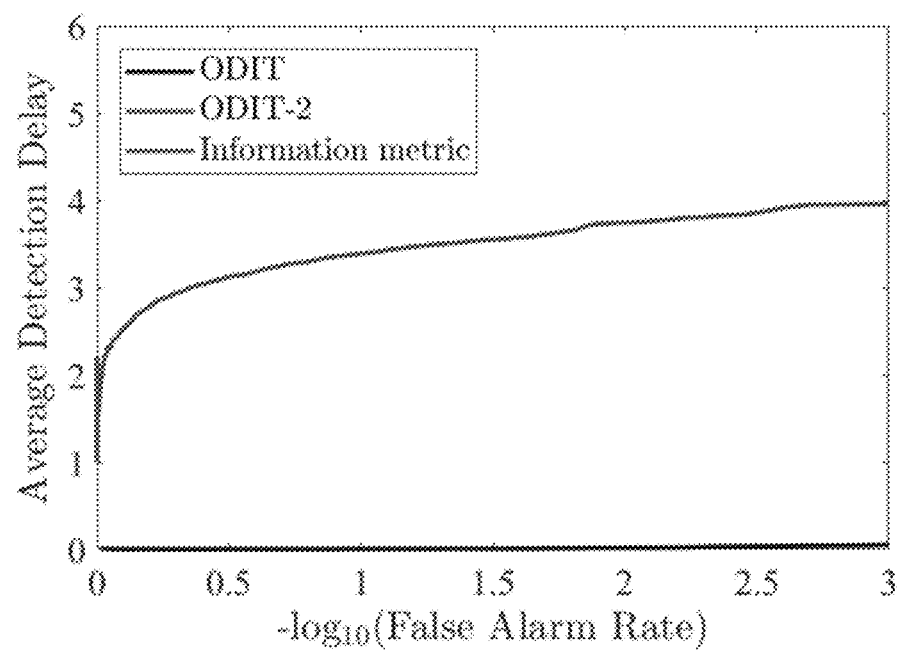
FIG. 11 is a graphical illustration of average detection performance of the proposed ODIT, ODIT-2 and information metric-based detectors in a DDOS simulation study.

In the ODIT algorithms, the parameters are set as k=1, s=1, $\alpha_1=0.05$, $\alpha_2=0.05$, $\gamma=1$. S=2. The results are obtained using N=2×105 nominal instances and M=105 anomalous instances. FIG. 10 shows the decision statistics of ODIT, ODIT-2 and the information metric-based algorithm. As depicted in the figure, ODIT statistics exhibit an abrupt increase. The best window size for the information metric-based method is found to be W=5. The information distance starts increasing only when the window contains enough number of anomalous data instances. This result is consistent with the average performance results (average detection delay vs. false alarm rate) shown in FIG. 11. The ODIT-2 detector achieves zero detection delay with no false alarm. Similarly, ODIT achieves very small average detection delay while satisfying very low false alarm rate at $10^{-3}$. Although the information metric-based method also achieves reasonable detection delays, compared to ODITs it suffers from its window-based nature. The smaller or larger window sizes do not give better results due to insufficient accuracy in probability distribution estimations and less sensitivity to anomalies, respectively.

Figure 12:
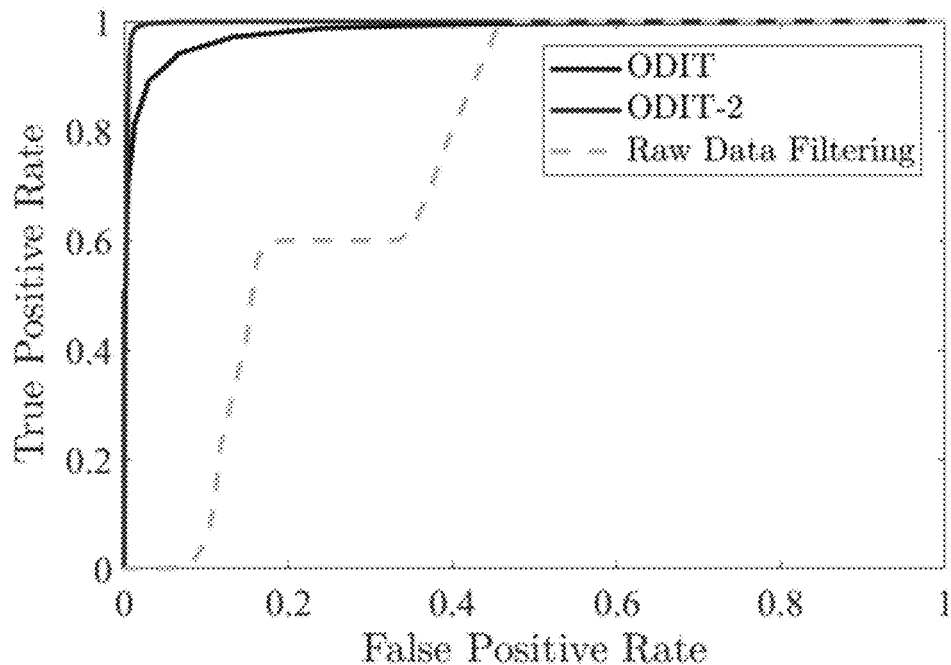
FIG. 12 is a graphical illustration of an ROC curve for identifying malicious devices in DDOS simulations, in accordance with an embodiment of the present invention.

The receiver operator characteristic (ROC) curves for localization of the malicious devices are shown in FIG. 12. In comparison with the data filtering approach, ODIT and ODIT-2 successfully identify the malicious devices with probability 0.95 and 1, respectively, while satisfying the false positive rate of 0.05. The conventional data filtering approach identifies a device as anomalous if its data rate exceeds a predefined threshold. Due to the small attack magnitudes in the simulated low-rate DDOS attack the data filtering approach fails to achieve high identification probability while satisfying small false positive rates.

C. Experiment on a Real Dataset: N-BaIoT:

In the second experiment, the proposed ODIT algorithms were evaluated using the N-BaIoT dataset, which consists of real IoT data traffic observations including botnet attacks. This data is collected from 9 IoT devices including doorbell, thermostat, baby monitor, etc. infected by the Mirai and BASHLITE malware. Here, only consider the Mirai attack dataset is considered. The benign and attack datasets for each device is composed of 115 features summarizing traffic statistics over different temporal windows. The dataset is collected for each device separately and lacks timestamp. The number of instances is varied for each device and attack type. Therefore, the training and test sets were formed by randomly choosing data instances from each device. To form a network-wide instance for multivariate detection, the chosen instances from 9 devices are stacked into a single vector of 1035 dimensions. This way, a nominal training set is obtained with N=10,000 instances. An anomalous training set is also built with M=5,000 instances for the Ecobee thermostat device (device 3). To test for both known and unknown attack types, ODIT-2 trains only on attack data from device 3, and test under two scenarios: (i) device 3 (Ecobee Thermostat) is compromised (known anomaly type) (ii) device 6 (Provision PT-838 security camera) is compromised (unknown anomaly type). The test data is formed similarly to the training data, assuming that the respective device gets compromised and starts sending malicious traffic at t=101. In the ODIT algorithms we set parameters as k=s=$\gamma$=1, $\alpha_1$=0.05, $\alpha_2$=0.1, S=2.

Figure 13:
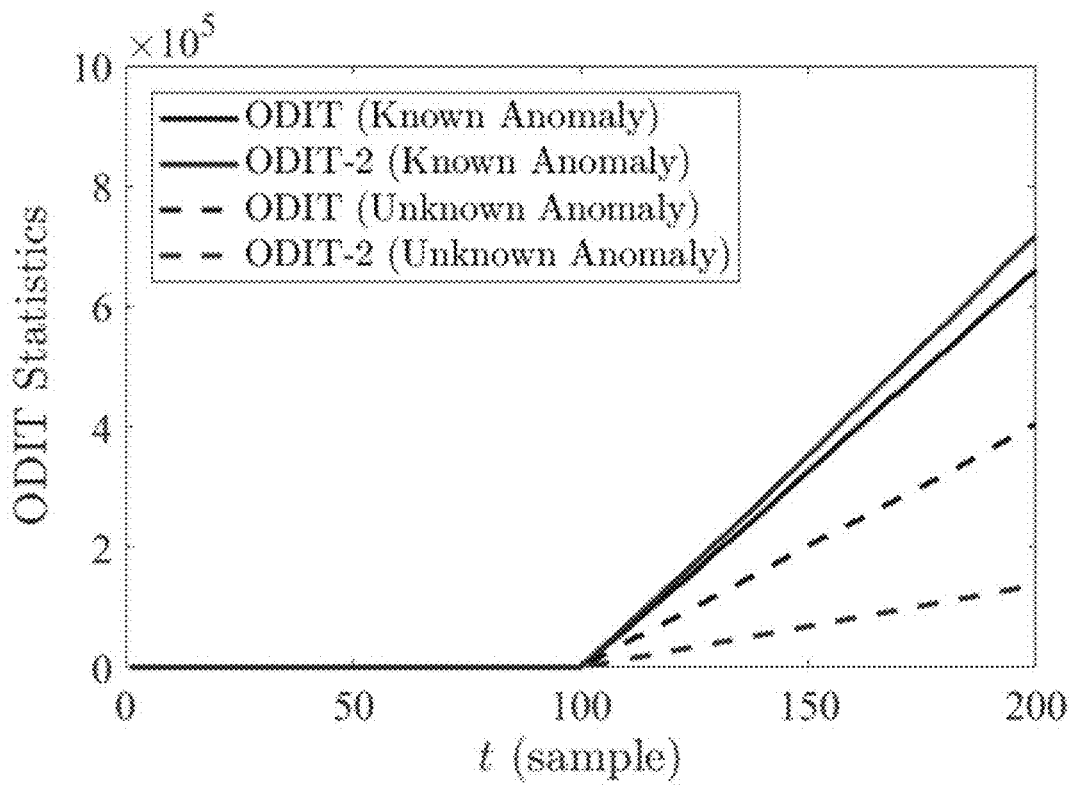
FIG. 13 is a graphical illustration of decision statistics of ODIT, ODIT-2 in both known and unknown attack scenarios for the N-BaloT dataset, in accordance with an embodiment of the present invention.
Figure 14:
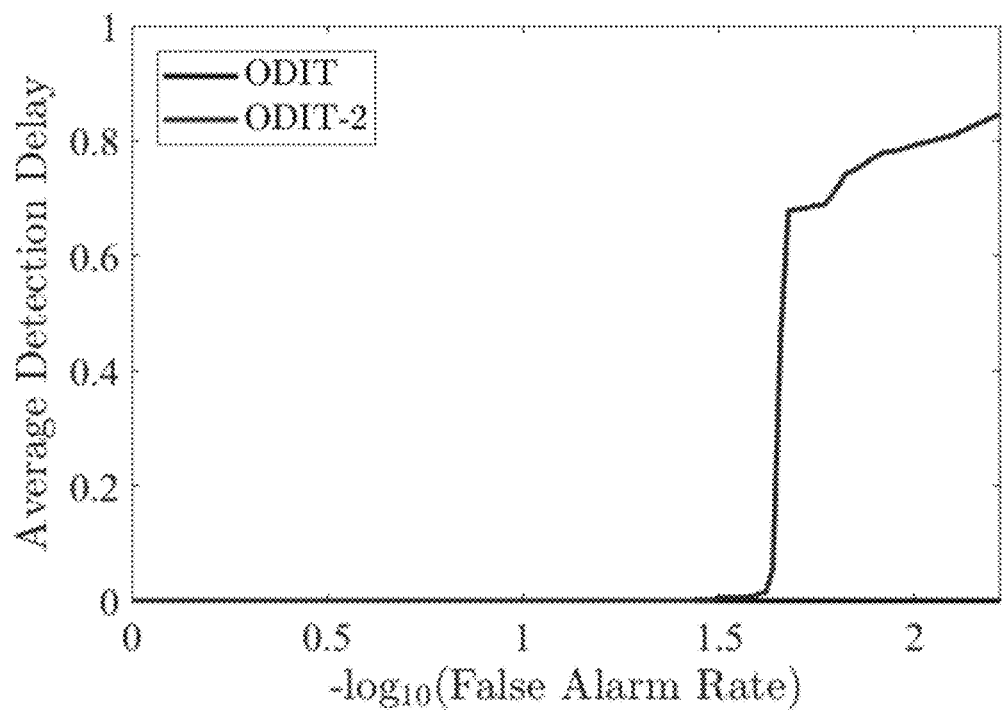
FIG. 14 is a graphical illustration of performance comparison for ODIT and ODIT-2 in the unknown attack scenario for the N-BaloT dataset, in accordance with an embodiment of the present invention.

An example of the decision statistics for ODIT and ODIT-2 under the two scenarios are shown in FIG. 13. ODIT is able to detect the attack with zero detection delay and zero false alarm in all trials in both known and unknown attack scenarios (FIG. 14). As for ODIT-2, which trains also on attack data from device 3, in the known attack scenario, zero detection delay with zero false alarm in all trials is achieved, similar to ODIT. FIG. 12 shows that the ODIT-2 decision statistic steadily rise even for the unknown attack when device 6 is attacking, yet with a smaller slope than that of ODIT, as expected. However, such a rise is not guaranteed to happen in general for unknown anomaly types. When an unknown anomaly occurs in the test observations, depending on whether the anomalous observations are relatively similar to the nominal dataset or to the anomalous dataset, ODIT-2 may or may not detect the anomaly. In the case where the anomalous data instances are relatively more similar to the nominal set than to the anomaly set, ODIT-2 statistics will remain zero and it will fail in detecting the anomaly. In the experiment, however, the unknown anomaly type, the attack data from device 6, is relatively more similar to the anomaly training set, the attack data from device 3. Therefore, ODIT-2 is able to detect it, as shown in FIG. 14, where the average detection performances of ODIT and ODIT-2 are given for scenario 2 (unknown anomaly).

Figure 15:
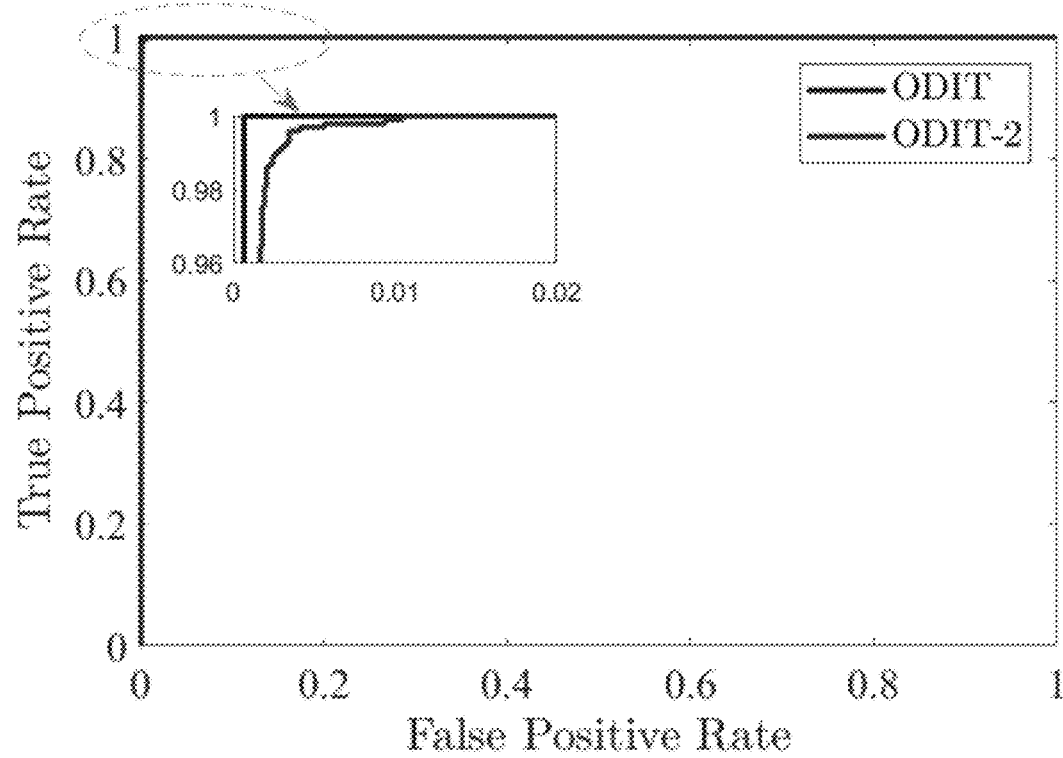
FIG. 15 is a graphical illustration of ROC curve for anomaly localization using ODIT and ODIT-2 in the known attack scenario for the N-BaloT dataset, in accordance with an embodiment of the present invention.

Next, the identification of malicious device is investigated in FIG. 15 in terms of the ROC curve (true positive rate vs. false positive rate) under the known anomaly scenario. Both variations of the proposed method of the present invention identify the malicious device with very high probability while achieving small false alarm rates such as 0.01. The contribution of each device to the decision statistic is calculated in (15) as the sum of the contributions of all 115 dimensions corresponding to the device.

We also compare the performance of ODIT is also compared to the deep autoencoder-based detection method, as they both train only on the nominal data. The autoencoder method marks each observation instance as nominal or anomalous and employs majority voting on a moving window of size ws* (to control the false positive rate), raising alarm only if the majority of the instances within the window are marked as anomalous. Due to its window-based majority rule, the sample detection delay (i.e., the number of anomalous instances observed before the detection) is at least $$\left\lfloor \frac{ws^*}{2} \right\rfloor + 1.$$

Figure 16:
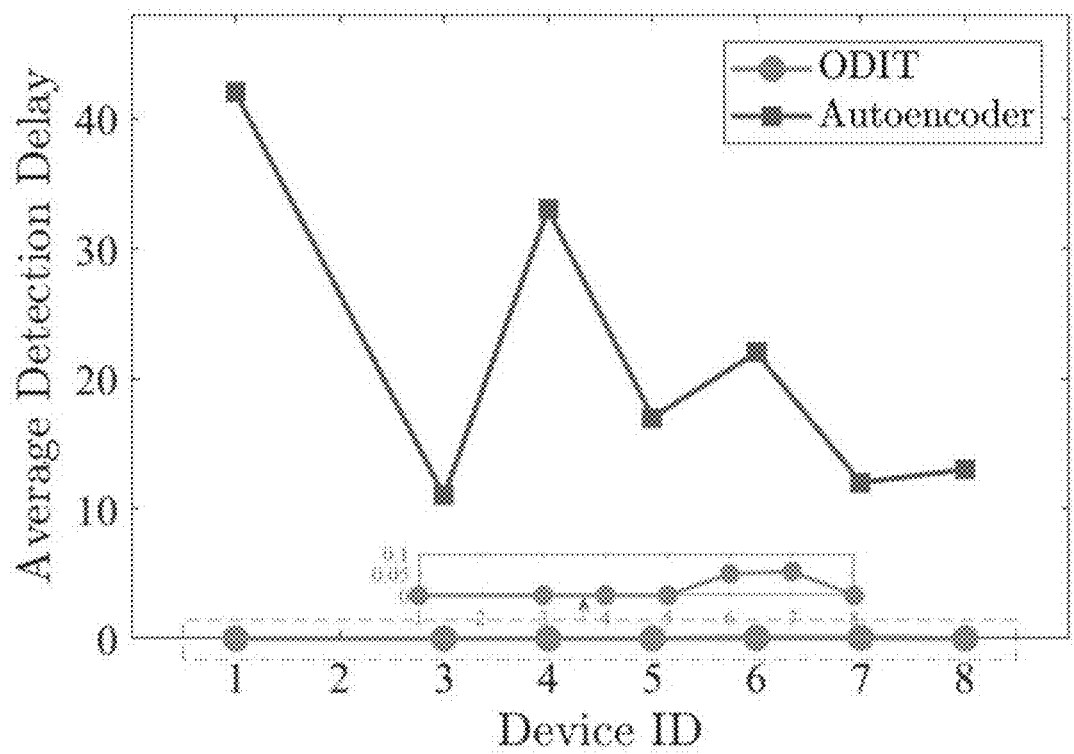
FIG. 16 is a graphical illustration of the average detection delay of the autoencoder method and ODIT in terms of number of samples for each device attack scenario, in accordance with an embodiment of the present invention.
Figure 17:
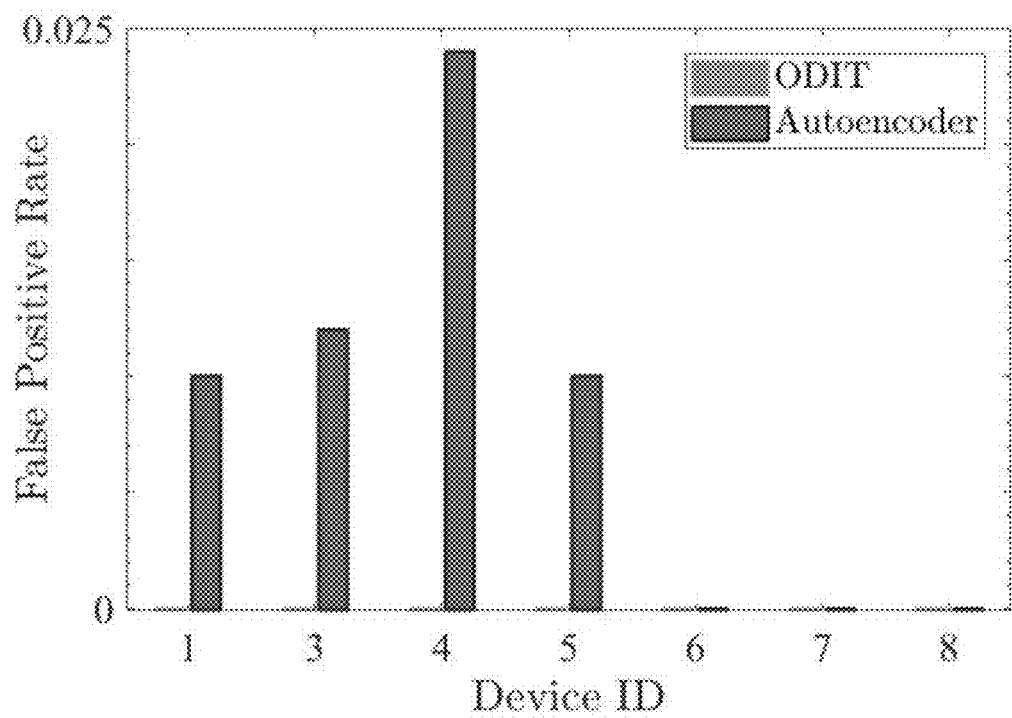
FIG. 17 is a graphical illustration of the false positive rate of the autoencoder method and ODIT for each device attack scenario, in accordance with an embodiment of the present invention.

Whereas, the sequential nature of ODIT enables immediate detection together with zero false alarm, as demonstrated in FIG. 16 and FIG. 17. Following the analysis for each device, the sample detection delay and the false positive rate of both methods are compared in FIG. 16 and FIG. 17, respectively. The optimum window sizes previously reported for each device are used for the autoencoder method.

D. Online Learning Scheme: ODIT-Uni

In this section, experimental results are presented to demonstrate the practical advantage of the unified framework ODIT-uni, in accordance with an embodiment of the present invention as previously described. Following the simulated and real-data experiments previously described, the algorithms are trained on the nominal data and anomaly data for a specific attack type. For the N-BaIoT dataset, the scenario 2 test is repeated, in which device 6 (Provision PT-838 security camera) starts sending malicious traffic while only attack data from device 3 is used to train ODIT-2. The simulation experiment previously described is extended by testing the trained algorithms on a new anomaly type. Specifically, at time t=101 a different set of devices start acting maliciously.

FIG. 17 shows, for both the simulated and N-BaIoT datasets, the average detection delay by ODIT-2 for a constant false alarm rate of 0.01, versus the number of the data points from the new anomaly type added to the anomaly training set. In both cases, as the number of the confirmed instances added to the anomaly training set grows, ODIT-2 detection delay decreases. The confirmation can be through either a human expert or a sufficiently high decision threshold for ODIT which avoids false alarms, as previously explained. In the simulated data, ODIT-2 is not able to detect the new anomaly type at the beginning without seeing any representative instance. However, even after seeing only a single instance of the new anomaly type, it is able to detect it with a reasonable delay around 10. Whereas, in the N-BaIoT dataset, ODIT-2 is able to detect the unknown anomaly at the first encounter with an average delay of 0.79, and the average delay converges to zero as the training set is enhanced with instances from the new anomaly type. In this way, ODIT-uni detects the unknown anomaly types through ODIT, and over time learns the geometry of new anomalies and improves its detection performance through ODIT-2.

In various embodiments, a computer implemented method is provided including an algorithm, called ODIT, that is suitable for quick and accurate anomaly detection and localization in high dimensional systems which require multivariate (i.e., joint) monitoring of system components. The proposed anomaly detection method is generic and applicable to various contexts as it does not assume specific data types, probability distributions, and anomaly types. It only requires a nominal training set and achieves asymptotic optimality in terms of minimizing average detection delay for a given false alarm constraint. It was shown how to benefit from available anomalous data (ODIT-2), and an online learning scheme (ODIT-uni) was presented that detects unknown anomaly types and over time improves its performance by learning from detected anomalies. The performance of the method of the present invention was evaluated in the context of DDOS attack detection and botnet detection using a simulated dataset and a real dataset. The experiments verified the advantage of proposed online learning method, and also showed that the proposed ODIT methods significantly outperform the state-of-the-art anomaly/change detection methods in terms of average detection delay and false alarm rate.

The proposed algorithms assume static nominal behavior and a static set of data dimensions. For instance, the proposed online learning scheme updates its anomaly knowledge in real-time, but it does not update its nominal data repository. Extending it to dynamic settings, such as an IoT network with dynamic topology and changing nominal behavior, remains to be an important future research direction.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various FIGS., it is to be understood that other similar embodiments can be used, or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A computer implemented method for data anomaly detection, the method comprising:
receiving a nominal training set comprising nominal data points by one or more computer processors;
partitioning, by the one or more computer processors, the nominal training set into a first subset of nominal data points and a second subset of nominal data points;
identifying, by the one or more computer processors, for each nominal data point in the first subset of nominal data points a kth-nearest-neighbor (k-NN) distance with respect to each nominal data point in the second subset of nominal data points;
selecting, by the one or more computer processors, the nominal data points with the smallest total edge length based upon the k-NN distances to estimate a most compact set of the nominal data points of the nominal training set having a smallest total edge length;
receiving, by the one or more computer processors, a test set of data points;
calculating, by the one or more computer processors, a total edge length to k-NN with respect to each nominal data point in the second subset of nominal data points;
calculating, by the one or more computer processors, first anomaly evidence for each of the data points of the test set based upon the total edge length and the smallest total edge length;
accumulating, by the one or more computer processors, the first anomaly evidence over time; and
declaring, by the one or more computer processors, that a first anomalous event has occurred when the first anomaly evidence accumulated over time exceeds a first predetermined threshold.

2. The method of claim 1, further comprising:
receiving an anomalous training set comprising anomalous data points by the one or more computer processors;
pre-processing, by the one or more computer processors, the anomalous training set to identify and remove anomalous data points that lie within the most compact set of the nominal data points to provide a pre-processed anomalous training set;

calculating, by the one or more computer processors, second anomaly evidence for each of the data points of the test set based upon the smallest total edge length and the pre-processed anomalous training set;

accumulating, by the one or more computer processors, the second anomaly evidence over time; and declaring, by the one or more computer processors, that a second anomalous event has occurred when the second anomaly evidence accumulated over time exceeds a second predetermined threshold.

3. The method of claim 2, further comprising, updating the anomalous training set based upon anomalous events declared with the nominal training set.

4. The method of claim 1, wherein the first predetermined threshold is selected to maximize early detection of the first anomalous event while also minimizing a false alarm rate of detection of the first anomalous event.

5. The method of claim 2, wherein the second predetermined threshold is selected to maximize early detection of the second anomalous event while also minimizing a false alarm rate of detection of the second anomalous event.

6. The method of claim 1, wherein the training set of nominal data points does not include any known anomalous data points.

7. The method of claim 2, wherein the nominal training set and the anomalous training set are received in parallel and wherein the step of declaring, by the one or more computer processors, that a first anomalous event has occurred and the step of declaring, by the one or more computer processors, that a second anomalous event has occurred are performed in parallel.

8. The method of claim 2, wherein the one or more computer processors are configured to identify a data dimension in which the first anomalous event or the second anomalous event occurred to localization the first anomalous event or the second anomalous event, respectively.

9. The method of claim 1, further comprising, after the first anomalous event has occurred:
  identifying, by the one or more computer processors, a most recent time when the first anomaly evidence was equal to zero to estimate an onset time of the first anomalous event; and
  localizing, by the one or more computer processors, the first anomalous event, by determining which dimension of the test set was anomalous at the onset time of the first anomalous event.

10. The method of claim 2, further comprising, after the second anomalous event has occurred:
  identifying, by the one or more computer processors, a most recent time when the second anomaly evidence was equal to zero to estimate an onset time of the second anomalous event; and
  localizing, by the one or more computer processors, the first anomalous event, by determining which dimension of the test set was anomalous at the onset time of the second anomalous event.

11. A computer implemented method for data anomaly detection, the method comprising:
  receiving a nominal training set comprising nominal data points and an anomalous training set comprising anomalous data points by one or more computer processors;
  partitioning, by the one or more computer processors, the nominal training set into a first subset of nominal data points and a second subset of nominal data points;
  identifying, by the one or more computer processors, for each nominal data point in the first subset of nominal data points a kth-nearest-neighbor (k-NN) distance with respect to each nominal data point in the second subset of nominal data points;
  selecting, by the one or more computer processors, the nominal data points with the smallest total edge length based upon the k-NN distances to estimate a most compact set of the nominal data points of the nominal training set having a smallest total edge length;
  receiving, by the one or more computer processors, a test set of data points;
  calculating, by the one or more computer processors, a total edge length to k-NN with respect to each nominal data point in the second subset of nominal data points;
  calculating, by the one or more computer processors, first anomaly evidence for each of the data points of the test set based upon the total edge length and the smallest total edge length;
  accumulating, by the one or more computer processors, the first anomaly evidence over time;
  declaring, by the one or more computer processors, that a first anomalous event has occurred when the first anomaly evidence accumulated over time exceeds a first predetermined threshold;
  pre-processing, by the one or more computer processors, the anomalous training set to identify and remove anomalous data points that lie within the most compact set of the nominal data points to provide a pre-processed anomalous training set;
  calculating, by the one or more computer processors, second anomaly evidence for each of the data points of the test set based upon the smallest total edge length and the pre-processed anomalous training set;
  accumulating, by the one or more computer processors, the second anomaly evidence over time; and
  declaring, by the one or more computer processors, that a second anomalous event has occurred when the second anomaly evidence accumulated over time exceeds a second predetermined threshold.

12. A computer program product for data anomaly detection, the computer program product comprising one or more non-transitory computer readable storage devices and program instructions stored on the one or more non-transitory computer readable storage devices, the program instructions comprising:
  programmed instructions receiving a nominal training set comprising nominal data points by one or more computer processors;
  programmed instructions partitioning, by the one or more computer processors, the nominal training set into a first subset of nominal data points and a second subset of nominal data points;
  programmed instructions identifying, by the one or more computer processors, for each nominal data point in the first subset of nominal data points a kth-nearest-neighbor (k-NN) distance with respect to each nominal data point in the second subset of nominal data points;
  programmed instructions selecting, by the one or more computer processors, the nominal data points with the smallest total edge length based upon the k-NN distances to estimate a most compact set of the nominal data points of the nominal training set having a smallest total edge length;
  programmed instructions receiving, by the one or more computer processors, a test set of data points;

programmed instructions calculating, by the one or more computer processors, a total edge length to k-NN with respect to each nominal data point in the second subset of nominal data points;

programmed instructions calculating, by the one or more computer processors, first anomaly evidence for each of the data points of the test set based upon the total edge length and the smallest total edge length;

programmed instructions accumulating, by the one or more computer processors, the first anomaly evidence over time; and programmed instructions declaring, by the one or more computer processors, that a first anomalous event has occurred when the first anomaly evidence accumulated over time exceeds a first predetermined threshold.

13. The computer program product according to claim 12, wherein the programmed instructions further comprise:

programmed instructions receiving an anomalous training set comprising anomalous data points by the one or more computer processors;

programmed instructions pre-processing, by the one or more computer processors, the anomalous training set to identify and remove anomalous data points that lie within the most compact set of the nominal data points to provide a pre-processed anomalous training set;

programmed instructions calculating, by the one or more computer processors, second anomaly evidence for each of the data points of the test set based upon the smallest total edge length and the pre-processed anomalous training set;

programmed instructions accumulating, by the one or more computer processors, the second anomaly evidence over time; and programmed instructions declaring, by the one or more computer processors, that a second anomalous event has occurred when the second anomaly evidence accumulated over time exceeds a second predetermined threshold.

14. The computer program product according to claim 13, wherein the programmed instructions further comprise programmed instructions updating the anomalous training set based upon anomalous events declared with the nominal training set.

15. The computer program product according to claim 12, wherein the first predetermined threshold is selected to maximize early detection of the first anomalous event while also minimizing a false alarm rate of detection of the first anomalous event.

16. The computer program product according to claim 13, wherein the second predetermined threshold is selected to maximize early detection of the second anomalous event while also minimizing a false alarm rate of detection of the second anomalous event.

17. The computer program product according to claim 12, wherein the training set of nominal data points does not include any known anomalous data points.

18. The computer program product according to claim 13, wherein the programmed instructions further comprise identify a data dimension in which the first anomalous event or the second anomalous event occurred to localization the first anomalous event or the second anomalous event, respectively.

19. A computer system for data anomaly detection, the computer system comprising:

one or more computer processors;
one or more computer readable storage devices;
program instructions stored on the one or more computer readable storage devices for execution by the one or more computer processors, the program instructions comprising;

programmed instructions receiving a nominal training set comprising nominal data points by one or more computer processors;

programmed instructions partitioning, by the one or more computer processors, the nominal training set into a first subset of nominal data points and a second subset of nominal data points;

programmed instructions identifying, by the one or more computer processors, for each nominal data point in the first subset of nominal data points a kth-nearest-neighbor (k-NN) distance with respect to each nominal data point in the second subset of nominal data points;

programmed instructions selecting, by the one or more computer processors, the nominal data points with the smallest total edge length based upon the k-NN distances to estimate a most compact set of the nominal data points of the nominal training set having a smallest total edge length;

programmed instructions receiving, by the one or more computer processors, a test set of data points;

programmed instructions calculating, by the one or more computer processors, a total edge length to k-NN with respect to each nominal data point in the second subset of nominal data points;

programmed instructions calculating, by the one or more computer processors, first anomaly evidence for each of the data points of the test set based upon the total edge length and the smallest total edge length;

programmed instructions accumulating, by the one or more computer processors, the first anomaly evidence over time; and programmed instructions declaring, by the one or more computer processors, that a first anomalous event has occurred when the first anomaly evidence accumulated over time exceeds a first predetermined threshold.

20. The computer system according to claim 19, wherein the program instructions further comprise:

programmed instructions receiving an anomalous training set comprising anomalous data points by the one or more computer processors;

programmed instructions pre-processing, by the one or more computer processors, the anomalous training set to identify and remove anomalous data points that lie within the most compact set of the nominal data points to provide a pre-processed anomalous training set;

programmed instructions calculating, by the one or more computer processors, second anomaly evidence for each of the data points of the test set based upon the smallest total edge length and the pre-processed anomalous training set;

programmed instructions accumulating, by the one or more computer processors, the second anomaly evidence over time; and programmed instructions declaring, by the one or more computer processors, that a second anomalous event has occurred when the second anomaly evidence accumulated over time exceeds a second predetermined threshold.

* * * * *